(12) United States Patent  
Boduch

(10) Patent No.: US 7,529,959 B1
(45) Date of Patent: *May 5, 2009

(54) SYSTEM AND METHOD FOR ALIGNING DATA IN A NETWORK ENVIRONMENT

(75) Inventor: Mark E. Boduch, Geneva, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,512

(22) Filed: Sep. 17, 2007

Related U.S. Application Data

(60) Division of application No. 11/272,885, filed on Nov. 14, 2005, now Pat. No. 7,272,739, which is a continuation of application No. 10/232,807, filed on Aug. 28, 2002, now Pat. No. 6,966,009.

(60) Provisional application No. 60/315,397, filed on Aug. 28, 2001.

(51) Int. Cl.
*H04J 3/24* (2006.01)
(52) U.S. Cl. ........................ 713/400; 713/401; 370/400; 370/474; 370/389; 370/394; 370/395.52
(58) Field of Classification Search ................. 713/400, 713/401; 370/400, 474, 389, 394, 395.52
See application file for complete search history.

(56) References Cited

U.S. PATENT DOCUMENTS

| | | | |
|---|---|---|---|
| 5,144,619 A | 9/1992 | Munter | |
| 5,256,958 A | 10/1993 | Eng et al. | |
| 5,285,441 A | 2/1994 | Bansal et al. | |
| 5,422,880 A * | 6/1995 | Heitkamp et al. | 370/352 |
| 5,436,886 A | 7/1995 | McGill | |
| 5,764,637 A | 6/1998 | Nishihara | |
| 5,862,136 A | 1/1999 | Irwin | |
| 6,038,231 A | 3/2000 | Dolby et al. | |
| 6,167,041 A | 12/2000 | Afanador | |
| 6,269,081 B1 | 7/2001 | Chow et al. | |
| 6,381,243 B1 | 4/2002 | Ekstedt | |
| 6,466,577 B1 | 10/2002 | Humblet et al. | |

(Continued)

*Primary Examiner*—Abdelmoniem Elamin
(74) *Attorney, Agent, or Firm*—Hamilton, Brook, Smith & Reynolds, P.C.

(57) ABSTRACT

In a network environment, a first master timing generator generates a first frame reference signal and a second master timing generator generates a second frame reference signal. A first data source generates a first data source signal, a first frame source signal, and a first clock source signal in response to a selected one of the first and second frame reference signals. Similarly, a second data source generates a second data source signal, a second frame source signal, and a second clock source signal in response to a selected one of the first and second frame reference signals. A timing recovery circuit generates a recovered reference signal and a recovered clock signal in response to a selected one of the first and second frame reference signals. A phase aligner stores the first data source signal in response to the first frame source signal and the first clock source signal. The phase aligner also stores the second data source signal in response to the second frame source signal and the second clock source signal. The phase aligner aligns a phase of the first data source signal with a phase of the second data source signal in response to the recovered reference signal and the recovered clock signal.

20 Claims, 15 Drawing Sheets

U.S. PATENT DOCUMENTS

| | | |
|---|---|---|
| 6,512,770 B1 | 1/2003 | Stemplinger |
| 6,519,261 B1 | 2/2003 | Brueckheimer et al. |
| 6,667,954 B1 | 12/2003 | Boduch et al. |
| 6,724,758 B1 | 4/2004 | Wright |
| 6,747,971 B1 | 6/2004 | Hughes et al. |
| 6,751,238 B1 | 6/2004 | Lipp et al. |
| 6,757,284 B1 | 6/2004 | Galles |
| 6,771,650 B1 | 8/2004 | Veeneman et al. |
| 6,788,686 B1 | 9/2004 | Khotimsky et al. |
| 6,798,784 B2 | 9/2004 | Dove et al. |
| 6,813,734 B1 | 11/2004 | Bhardwaj |
| 6,826,175 B1 | 11/2004 | Gammenthaler et al. |
| 6,857,080 B1 | 2/2005 | Liang |
| 6,870,831 B2 | 3/2005 | Hughes et al. |
| 6,966,009 B1 * | 11/2005 | Boduch ....................... 713/500 |
| 7,065,103 B1 | 6/2006 | Gagnon et al. |
| 7,346,067 B2 * | 3/2008 | Chung et al. ................. 370/412 |
| 2002/0150047 A1 | 10/2002 | Knight et al. |
| 2003/0118052 A1 | 6/2003 | Kuhl et al. |

* cited by examiner

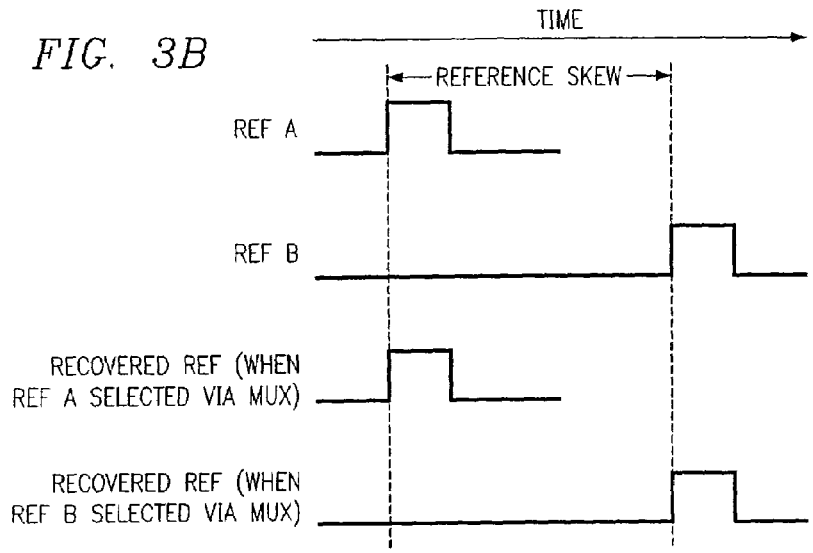
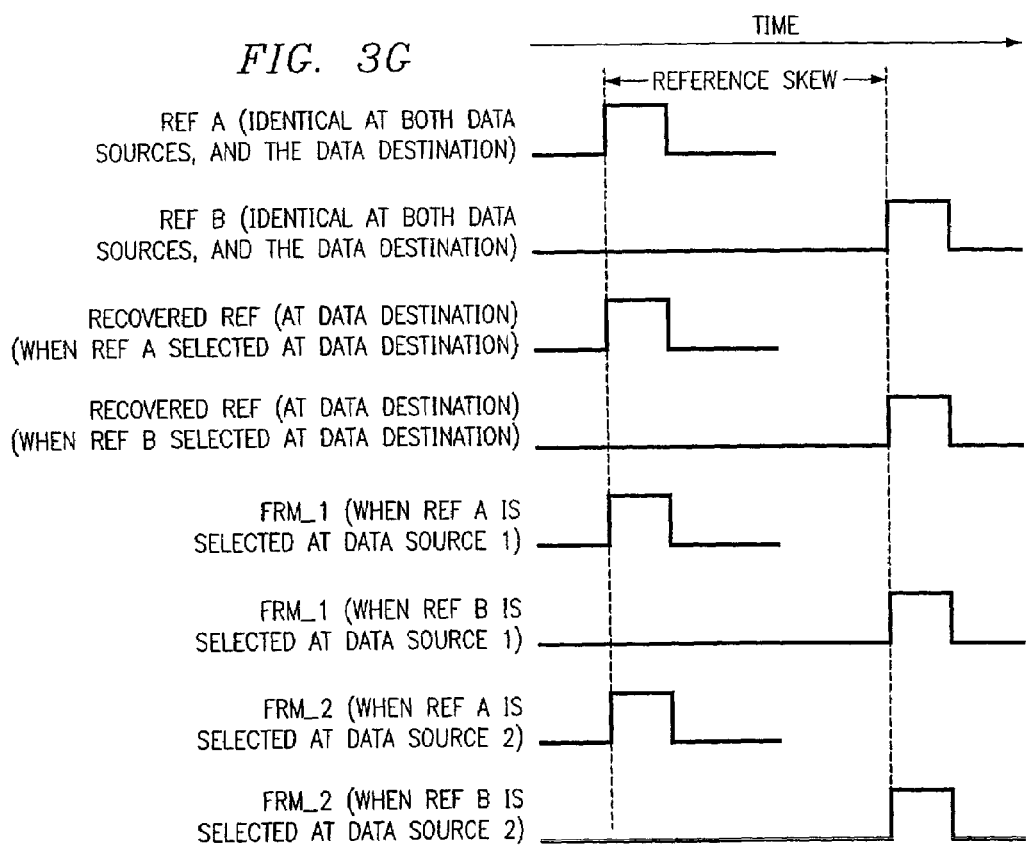

SYSTEM AND METHOD FOR ALIGNING DATA IN A NETWORK ENVIRONMENT

RELATED APPLICATIONS

The present application is a divisional application of U.S. application Ser. No. 11/272,885 filed Nov. 14, 2005 and now U.S. Pat. No. 7,272,739, which is a continuation application of U.S. application Ser. No. 10/232,807 filed Aug. 28, 2002 and now U.S. Pat. No. 6,966,009 issued Nov. 15, 2005, which claims the benefit under 35 U.S.C. §119 of Provisional Application Ser. No. 60/315,397 filed Aug. 28, 2001.

TECHNICAL FIELD OF THE INVENTION

This invention relates in general to the field of network communications and more particularly to a system and method for aligning data in a network environment.

BACKGROUND OF THE INVENTION

Data communications have grown increasingly complex in today's networking systems. The ability to properly manage and direct information in a communications architecture presents a significant challenge for network designers and system administrators. Part of this difficulty resides in the inconsistent nature of incongruent data signals that may be out of phase or incorrectly synchronized with each other or other data segments. In some cases, one or more data streams may need to be properly aligned or ordered to sufficiently process associated information. Data streams that arrive at a given network component in an erratic or misaligned fashion may cause congestion in a network. Additionally, such random communications may cause significant delays that are produced because of the time necessary to properly order the information streams. The requisite ordering may be generally performed before processing of the data or routing of the information to a next destination. These delay intervals may inhibit communication speeds and further limit bandwidth allocations for a corresponding network architecture.

SUMMARY OF THE INVENTION

From the foregoing, it may be appreciated by those skilled in the art that a need has arisen for an improved approach for aligning one or more data streams in a network environment. In accordance with one embodiment of the present invention, a system and method for aligning data in a network environment are provided that substantially eliminate or greatly reduce disadvantages and problems associated with conventional data management or data processing techniques.

According to one embodiment of the present invention, there is provided a system for communicating data in a network environment that includes a first master timing generator for generating a first frame reference signal and a second master timing generator for generating a second frame reference signal. A first data source generates a first data source signal, a first frame source signal, and a first clock source signal in response to a selected one of the first and second frame reference signals. A second data source generates a second data source signal, a second frame source signal, and a second clock source signal in response to a selected one of the first and second frame reference signals. A timing recovery circuit generates a recovered reference signal and a recovered clock signal in response to a selected one of the first and second frame reference signals. A phase aligner stores the first data source signal in response to the first frame source signal and the first clock source signal and stores the second data source signal in response to the second frame source signal and the second clock source signal. The phase aligner aligns a phase of the first data source signal with a phase of the second data source signal in response to the recovered reference signal and the recovered clock signal.

The present invention provides various technical advantages over conventional signal processing techniques. Some of these technical advantages are shown in the description of the present invention. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3B is a simplified timing diagram associated with the timing recovery circuit;

FIG. 3G is a simplified timing diagram illustrating an example set of timing relationships associated with aligning data in a network environment;

DETAILED DESCRIPTION OF THE INVENTION

Figure 1:
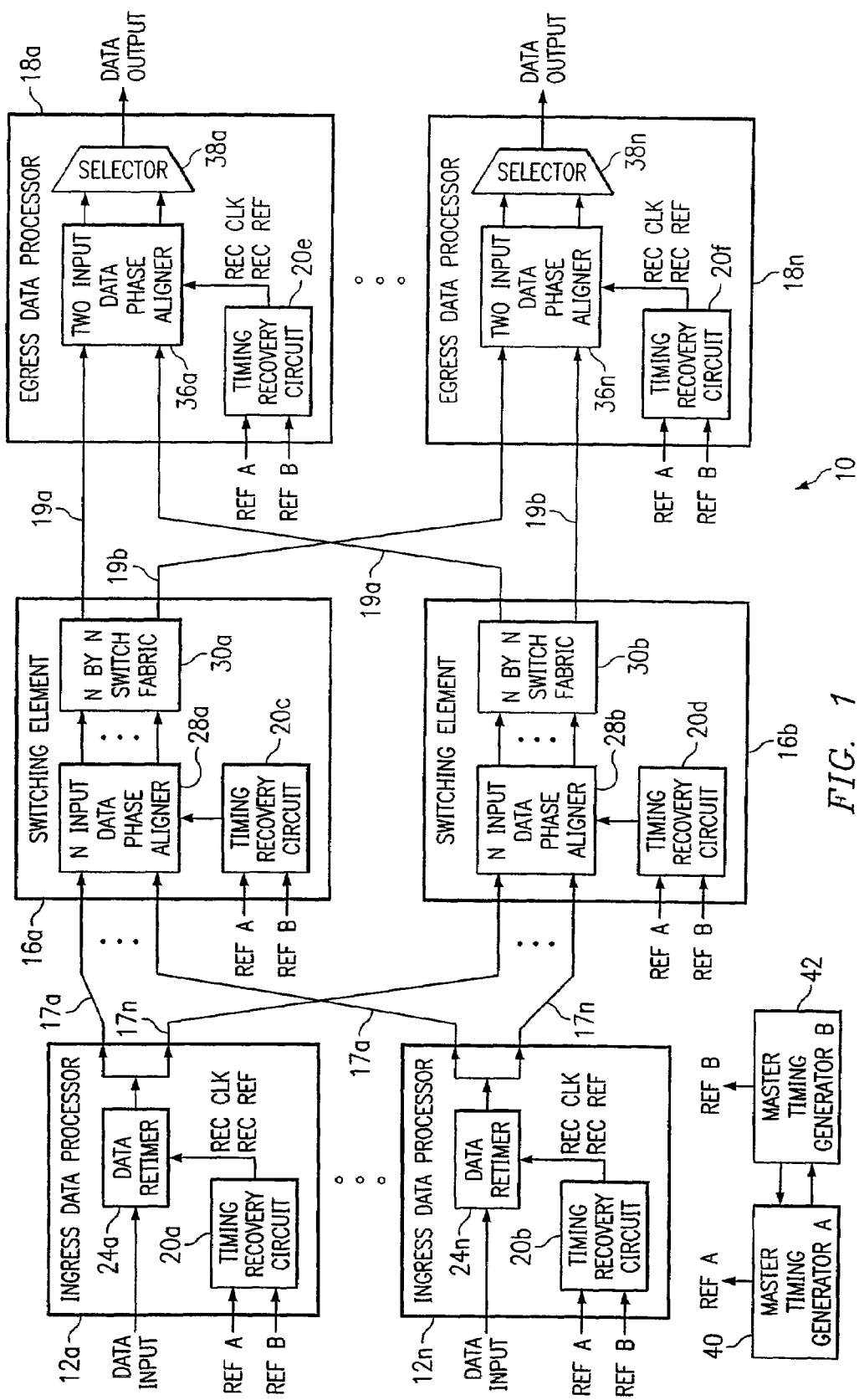
FIG. 1 is a simplified block diagram of a communication system for aligning data in a network environment.

FIG. 1 is a simplified block diagram of a communication system 10 for processing data in a network environment in accordance with one embodiment of the present invention. Communication system 10 may be positioned at any suitable location within or external to a communications architecture in order to facilitate the delivery, transmission, or switching of information or data. Communication system 10 may include multiple ingress data processors 12a-n, a set of switching elements 16a and 16b, and multiple egress data processors 18a-n. Additionally, communication system 10 may include multiple timing recovery circuits 20a-f positioned within multiple elements included within communication system 10.

In accordance with the teachings of the present invention, communication system 10 operates to provide a communications platform that synchronizes or otherwise aligns multiple data streams propagating in a network environment. This may be effectuated by elements included within switching elements 16a-b. Alternatively, this synchronization may be produced by an alignment element included within each of egress data processors 18a-n. The elements included within communication system 10 may generally cooperate in order to align multiple data streams in a clocked system that may potentially be utilizing multiple system clock sources. The clock sources may be frequency and phase-locked with one another in certain scenarios. However, the clock sources may be provided with a phase offset between the outputs of two clock sources. Accordingly, a phase aligner may be invoked to appropriately align one or more data streams in order to adequately prepare the data to be switched or communicated to a next destination.

The alignment operation provides for more precise communications in a network environment. The phase aligner may receive one or more data streams and accurately process or order the information such that it is properly arranged. The ordered information may now be appropriately switched by switching elements 16a-b. The ordering or synchronization feature provided to communication system 10 may increase processing speeds and further ensure the accurate delivery of information or data contained within the data stream.

In an alternative embodiment, a redundancy feature is provided to communication system 10. Multiple data streams may be communicated by each of switching elements 16a-b to corresponding egress data processors 18a-n over egress data processor links 19a-b. The phase aligner may then be implemented such that two data streams have a substantially similar data payload and are communicated to a single network node. The two data streams may be compared such that the data stream that contains more errors is discarded. The other data stream, having higher integrity, may then be properly forwarded to an appropriate next destination. Thus, the phase aligner may increase the accuracy and efficiency of an associated communication propagating through communication system 10.

Ingress data processors 12a-n are communications elements operable to receive data input from a suitable source and a clocking signal from a timing element provided within or external to communication system 10. Ingress data processor 12a and 12n may include a timing recovery circuit 20a and 20b and a data retimer 24a and 24n respectively. In the example embodiment provided, communication system 10 represents a networking architecture that may include multiple data processors and N by N corresponding switching elements 16a-b.

Each ingress data processor 12a-n may create a stream of system bytes based on information that is received from corresponding synchronous optical network (SONET)/synchronous digital hierarchy (SDH) inputs. System bytes may be appropriately forwarded to associated switching elements 16a-b via suitable ingress data processor links 17a-n. A given data processor link (either ingress or egress) may transport system bytes that contain multiple data types (e.g., time division multiplexed (TDM) data, asynchronous transfer mode (ATM) data, or Internet Protocol (IP) packet data). However, because certain types of data share similar intrinsic properties (for example ATM and IP packet data may share similar characteristics), a given data processor may be used to process both ATM and IP packet type system bytes. Once the system bytes arrive at switching elements 16a-b, each system byte may be forwarded to its destination egress data processor 18a-n via a set of switch fabrics 30a-b provided within switching elements 16a-b.

Multiple types of ingress data processors 12a-n and egress data processors 18a-n may be included within communication system 10. For example, physical layer processors or content processors may be provided at the ingress portion of communication system 10 where appropriate. These processors may be used to interface with SONET OC-12 facilities, SONET OC-48 facilities, or SONET OC-192 facilities as well as other types of facilities including for example electrical facilities. Each of the ingress data processors may include suitable hardware, software, components, or elements operable to facilitate the management, direction, or communication of data or information to and from each of switching elements 16a-b.

Each ingress data processor 12a-n may operate to terminate lower level protocols associated with an incoming data input signal and further to prepare the data input signal for switching. Part of this preparation may include retiming the data input signal to one of the system clocks that are generated by a master timing generator A 40 or a master timing generator B 42. Master timing generator A 40 and master timing generator B 42 may provide suitable timing and synchronization for communication system 10. Master timing generator A 40 and master timing generator B 42 may provide a series of clock cycles or signals that provide an initiation for implementing one or more instructions associated with incoming data signals or data processing operations. Communication architectures generally include redundant system timing sources (i.e., master timing generators) such that, in the event that one timing source fails, another timing source may supply timing to the architecture. In order to take advantage of the redundant timing sources, each master timing generator 40 and 42 may distribute a timing signal to each physical entity or module within communication system 10.

Additionally, each physical entity that receives the two timing signals may be capable of selecting between the two signals. Communication system 10 may implement this function using timing recovery circuits 20a-f. Accordingly, any given module may be allowed to select a designated one of the two timing signals that are delivered to it independent of all other modules or elements within communication system 10. Thus, any number of modules or elements within communication system 10 may be obtaining their timing information from either master timing generator A 40 or master timing generator B 42.

Switching elements 16a-b are communications interfaces that represent a common switching platform positioned between ingress data processors 12a-n and egress data processors 18a-n. Switching elements 16a-b may include data phase aligners 28a-b, switching fabrics 30a-b, and timing recovery circuits 20c-d. Switching elements 16a-b may also include any other suitable hardware, software, components, or elements operable to facilitate the management, direction, or communication of data or information in a network environment. Switching elements 16a-b may accommodate various types of data or information communicated by ingress data processors 12a-n.

Switching elements 16a-b may each include a control processor (and support permanent virtual connection applications where appropriate) and distributed packet stacks for other suitable communication applications. Switching elements 16a-b may be of any fabric type, including for example cell based, packet based, or TDM based fabrics. Switching elements 16a-b may also include a multiplexer or demultiplexer that operate to compress or decompress incoming data at any suitable ratio, such as 1:8 or 8:1 for example, over suitable communications links. Switching elements 16a-b may additionally include other suitable elements that facilitate the delivery, transmission, or processing of various types of data or information.

Data phase aligners 28a-b and two-input data phase aligners 36a-n may be used for various applications within communication system 10. For example, in the context of redundancy switching, two-input data phase aligner 36a-n may be used to align one or more similar data streams communicated by switching elements 16a-b. This alignment may be used in preparation for selecting the least errored data within the data streams. Any suitable number of data streams may be compared in order to select an optimal data stream to be communicated to a next destination. Use of the term 'two-input' as used in conjunction with a given phase aligner is offered for purposes of convenience and example only as three or more inputs may be implemented equally as well.

In operation of an example embodiment, two data streams may be received by switching elements 16a-b from ingress data processors 12a and 12n. Similar data may be sent from each of the other ingress data processors. A given switching element 16a-b may then switch data arriving on its N incoming links to N outgoing links such that (in the absence of errors) the data on output link i of switching element 16a is similar to the corresponding output link i of switching element 16b.

Two-input data phase aligner 36a or 36n may then be used to align the two data streams from switching elements 16a-b such that data may be distinguished from one another using a set of selectors 38a or 38n. Selectors 38a or 38n may identify or otherwise designate a data stream as suitable to be communicated to a next destination based on the number of errors contained within each data stream. These selections may be made on a channel-by-channel basis or alternatively on any other suitable basis in accordance with particular needs. Thus, in such an application only two-input data phase aligners 36a and 36b are needed to properly compare two data streams in order to designate one as optimal for communications to a next destination.

In operation of an alternative embodiment, data phase aligners 28a-b may be implemented in order to align multiple data streams. The incoming data streams may be communicated by ingress data processors 12a-n. Data phase aligners 16a-b may cooperate with timing recovery circuits 20c and 20d in order to suitably prepare the incoming data signal for switching. Alignment may be performed such that each channel j of a given input is aligned to channel j of all other inputs. This provides for a manipulation in phase such that the incoming signals are consistent and may be properly switched and communicated to a next destination. Accordingly, two-input data phase aligners 36a-n may or may not be needed in such an application in order to effectively align and communicate the data streams. It should be noted that each of phase aligners 28a-b and two-input data phase aligners 36a-n may be used to align incoming streams of data for switching regardless of which master timing source is being used to generate an incoming data stream.

Figure 2:
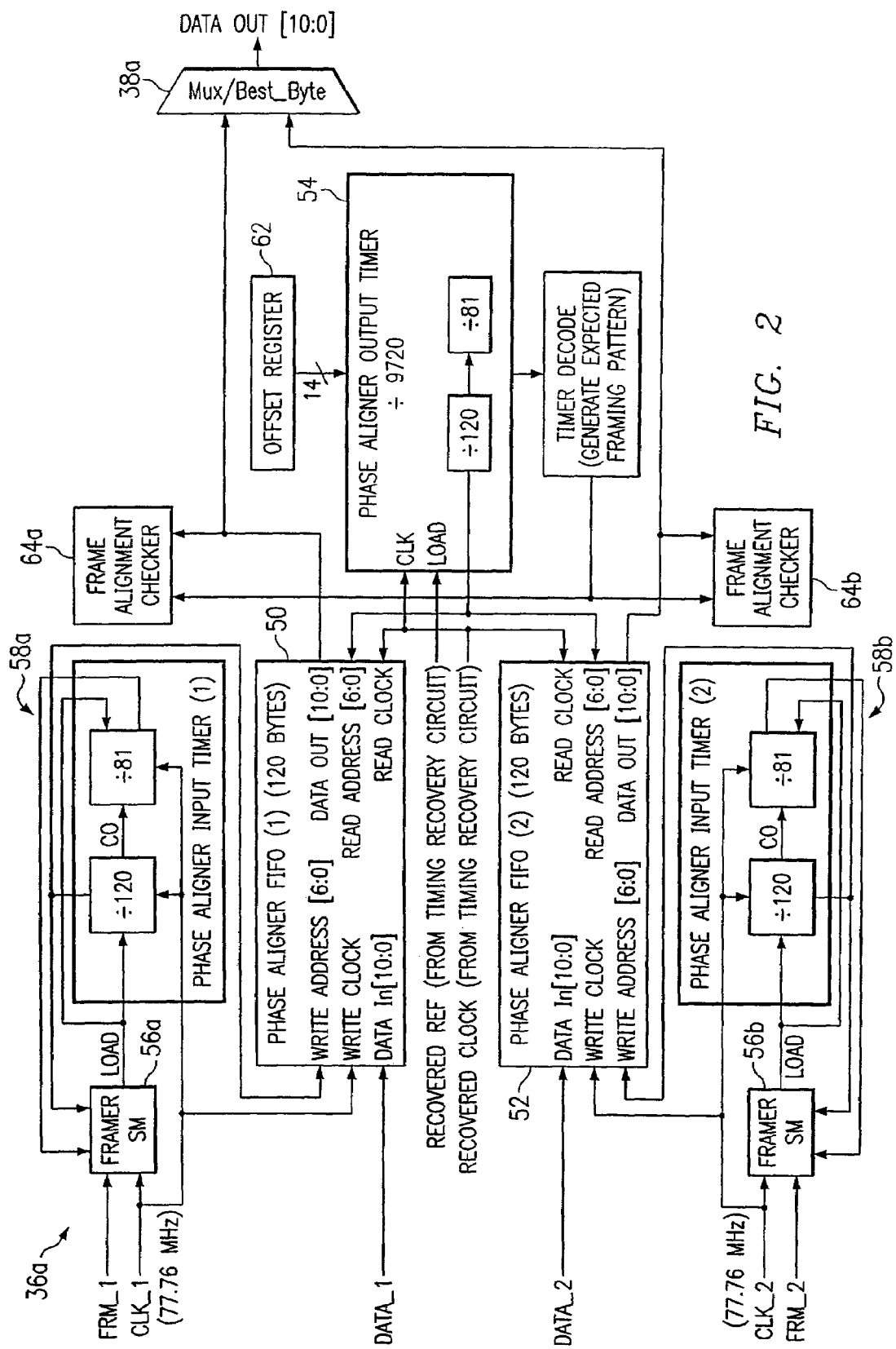
FIG. 2 is a simplified block diagram of a data phase aligner included within the communication system.

FIG. 2 is a simplified diagram of an example implementation of each of two input data phase aligners 36a-n included within communication system 10. The description of two input data phase aligners 36a-n may equally extend to N input data phase aligners 28a-b. The example implementation offers a synchronous transport signal (STS) based structure and thus an STS-12 phase aligner is reflected. Each STS-12 based phase aligner may obtain their timing information from an appropriate non-dedicated timing recovery circuit 20a-f. It is important to note that because data phase aligners 28a and 28b and data phase aligners 36a and 36n share similar properties, these elements may be interchanged in certain applications or arranged differently in accordance with particular needs. Moreover, one or more of the operations of either element may be included in a single phase aligner, allowing either of the elements to be eliminated entirely within communication system 10.

Data phase aligner 36a may include two phase aligner first-in-first-out (FIFO) elements 50 and 52. FIFO elements 50 and 52 may be used to align 'DATA_1' and 'DATA_2' input signals to a common reference identified as 'RECOVERED REF' that is supplied by timing recovery circuit 20a. Data phase aligner 36a may effectively align the SONET transport overhead (TOH) elements associated with the two sources. Thus, following successful alignment, relationships between the two output data streams and their subsequent relationship to a phase aligner output timer 54 may be consistent. The TOH bytes of the two sources may be aligned at the output of FIFO elements 50 and 52. The depth of FIFO elements 50 and 52 may be generally greater than two times the maximum skew that may occur between the two sources. Thus, in accordance with the example provided, a one-hundred twenty byte FIFO may correct for a skew of nearly sixty byte times between the two sources though the depth of FIFO elements 50 and 52 are not limited to 120 bytes.

A set of framer state machines 56a-b and a set of phase aligner input timers 58a-b are provided in data phase aligner 36a. The purpose of each of framer state machines 56a and 56b is to filter out momentary disturbances or bit errors in the 'FRM_x' signal. Filtering techniques or approaches may be as simple or as complex as designated by particular needs. In an example implementation, each framer state machine 56a and 56b may operate in conjunction with a corresponding phase aligner input timer 58a and 58b. Each framer state machine 56a and 56b may compare the position of the 'FRM_x' signal to the phase aligner input timer state.

If the 'FRM_x' signal is active when a given phase aligner input timer state does not equal state twenty-four (decimal), then a defect may be declared. When a defect is declared in three consecutive SONET frame periods, then the associated phase aligner input timer may be loaded with a new value based upon the latest 'FRM_x' signal. The value loaded into phase aligner input timers 58a-b may be fixed and predetermined. A value may be loaded such that the relationship that is selected is obtained. For example, depending upon implementation, the value loaded might be twenty-five (decimal). Generally, a value is loaded into the phase aligner input timer such that the state of the timer can be used to locate the TOH bytes within the input data stream. Additionally, such timers need not be restricted to the use of any type of software. The lower portion of each of phase aligner input timers 58a-b may be used as a write address generator for its corresponding FIFO element 50 or 52. Thus, the J0 byte of the first STS-1 may be written into location twenty-four (decimal) of a corresponding FIFO element 50 or 52. In this manner, a known byte location within the SONET stream is written into a known location of FIFO elements 50 and 52. Further discussion on the relationship between the 'FRM_x' signal and the phase aligner input timer is provided below.

Phase aligner output timer 54 is a synchronizing element that may be loaded with the value of the offset register 62 using a pulse from a corresponding timing recovery circuit. Phase aligner output timer 54 may be used to indicate the location of various TOH bytes exiting each of FIFO elements 50 and 52. Because the J0 byte of the first STS-1 may be written into location twenty-four of the two FIFO elements 50 and 52 when phase aligner output timer 54 has a state of twenty-four, the selected byte of the first STS-1 may be read out of a corresponding FIFO element 50 and 52. As indicated in FIG. 2, the lower portion of phase aligner output timer 54 is used as the read address generator for the two phase aligner FIFO elements 50 and 52. The lower portion of phase aligner output timer 54 may be shared between the two FIFO elements 50 and 52. One factor implicated in the centering of phase aligner FIFO elements 50 and 52 involves the proper programming of an offset register 62 associated with phase aligner output timer 54.

Phase aligner 36a has a FIFO element size that is a divisor of the length of the frame associated with the incoming data. In the example of FIG. 2, each FIFO element 50 and 52 is used to store 11 bit data words. Of these 11 bits, 8 of the bits (one byte) are actual STS-12 data and the other three bits are internal system overhead bits. The overhead bits might be used, for example, to hold parity information for error checking purposes at selector 38a. Each FIFO element 50 and 52 stores 120 bytes of actual STS-12 data. Since an STS-12 frame includes 9720 bytes of STS-12 data (810×12) per SONET frame (125 microseconds), the STS-12 frame length is 9720 bytes. The frame length corresponds to the number of bytes between the start of each framing pattern within a given data stream. A FIFO element size of 120 evenly divides into 9720 to provide an integer value.

Frame alignment checker 64a is designed to look for the first byte of the SONET framing pattern when phase alignment output timer 54 is at state 0. Since the lower portion of phase alignment output timer 54 (the divide by 120 portion) is used to supply write addresses to FIFO elements 50 and 52, location 0 of each FIFO element 50 and 52 will be read when phase aligner output timer 54 is at 0. Therefore, frame alignment checker 64a expects to find the first byte of the STS-12 framing pattern in location 0 of FIFO elements 50 and 52. Likewise, it expects to find the second byte of the STS-12 framing pattern in location 1 of FIFO elements 50 and 52 and the J0 byte of the first STS-1 in location 24 of FIFO elements 50 and 52. This becomes possible due to the size of FIFO elements 50 and 52 being a divisor of the frame length. If it was not, then the first byte of the STS-12 framing pattern would be located in a different location within FIFO elements 50 and 52 every frame period. Frame alignment checker 64a would not be able to locate the framing pattern, as it is designed to expect to see the first byte of the STS-12 framing pattern in location 0 of FIFO elements 50 and 52. By having the size of FIFO elements 50 and 52 being a divisor of the frame length, frame alignment checker 64a does not need to search through FIFO elements 50 and 52 to locate the framing pattern, which allows frame alignment checker 64a to quickly declare itself to be in frame. Other possible sizes of FIFO elements 50 and 52 for a 9720 byte frame length include, but are not limited to, 81, 135, 162, 360, and 405.

As shown above, the input signals received by any phase aligner from a data source include a data source signal 'DATA_x', a frame source signal 'FRM_x', and a clock source signal 'CLK_x'. These signals provided by the data source may be on three physically separate links or provided together on a single physical link. It also may be possible to provide only the data source signal and the frame source signal, either transported as separate signal links or transported on a single link, and later derive the clock source signal from the frame source signal when needed.

Figure 3A:
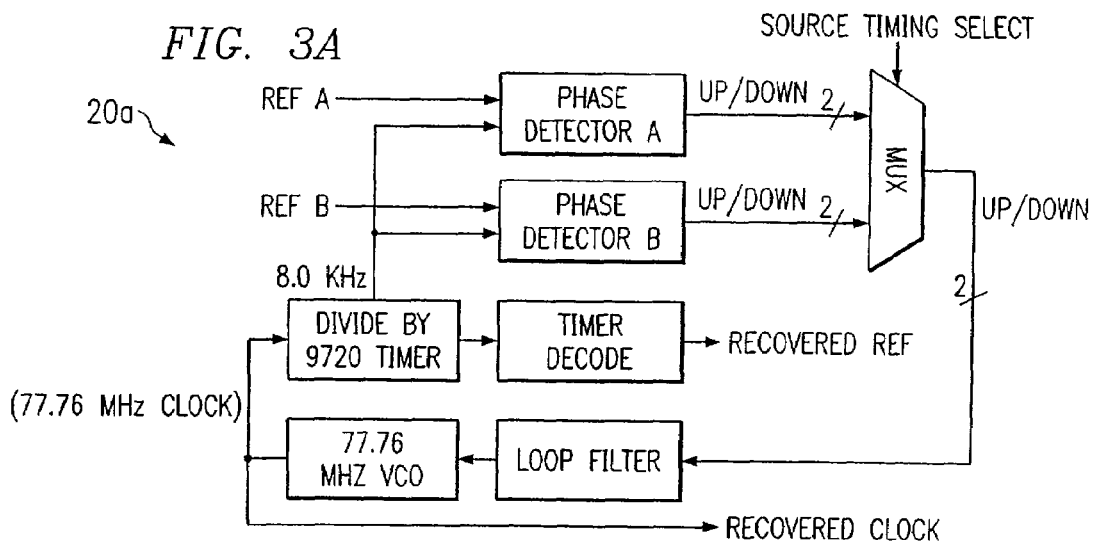
FIG. 3A is a simplified block diagram of a timing recovery circuit included within the communication system.
Figure 3C:
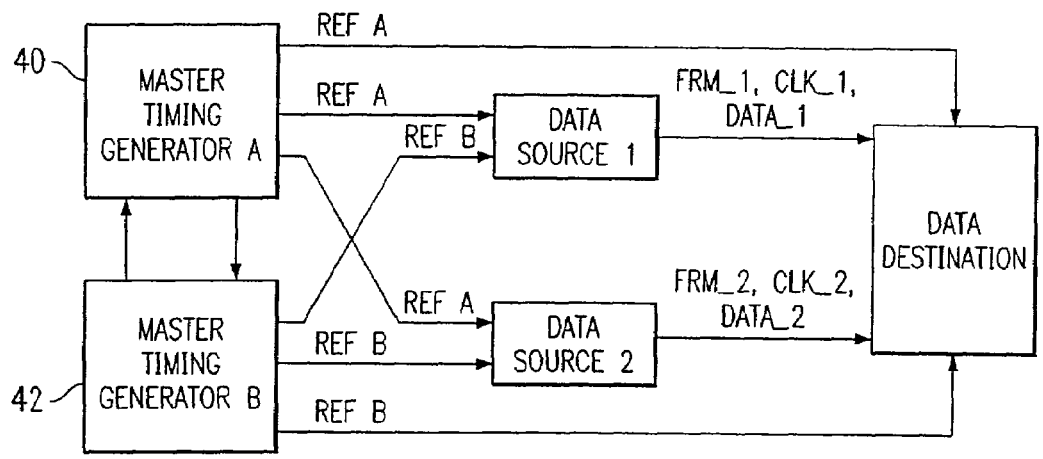
FIG. 3C is a simplified timing diagram associated with system timing distribution.

FIG. 3A is a simplified block diagram of timing recovery circuits 20a-f included within communication system 10. The corresponding operation of timing recovery circuits 20a-f are illustrated by the timing diagram of FIG. 3B. In addition FIG. 3C is a simplified diagram illustrating an example system timing distribution within communication system 10. The example timing diagram illustrated by FIG. 3B is related to FIGS. 3A and 3C in that it assumes that the two data sources as well as the data destination include an example timing recovery circuit 20a-f of FIG. 3A, which produces the output signals illustrated in FIG. 3B. In FIG. 3C, master timing generator A 40 and master timing generator B 42 may be suitably coupled to one another whereby one serves as a master and the other as a slave. Additionally, a static phase timing skew may exist between these two elements. Data Source 1, as illustrated in FIG. 3C, includes an output signal comprising the FRM_1, CLK_1, and DATA_1 signals based on either REF A or REF B from master timing generators 40 and 42. Also, Data Source 2 includes an output signal that comprises FRM_2, CLK_2, and DATA_2 signals generated based on either REF A or REF B from master timing generators 40 and 42. Both output signals may be fed to a data destination, which may additionally receive REF A and REF B signals from master timing generators 40 and 42 respectively.

Timing recovery circuit 20a is a customized phase locked loop (PLL) implementation, containing two phase detectors. The PLL is used to generate timing information after selecting a timing source, and provides a smooth transition when switching between the timing sources. However, a PLL is not used to directly center either of FIFO element 50 or 52 and thus the performance of phase aligner 36a does not depend on any PLL. In this manner, the parameters associated with the PLL used in a timing recovery circuit of a given module can be set based on other timing needs associated with the given module. Delay in the alignment process is avoided by not having a dedicated PLL in phase aligner 36a.

In a typical system application, it may not be practical to forward the frame reference signals from the master timing generators to a data destination. For example, the data destination may be at a great distance from the master timing generators. Moreover, there may be a failure, a design choice, or other reason that the timing recovery circuit does not receive the frame reference signals from the master timing generators. In such situations, the frame source signals from the data sources may be used instead to generate the recovered reference signal and the recovered clock signal. This would allow for a smooth transition between the two clock sources.

Figure 3D:
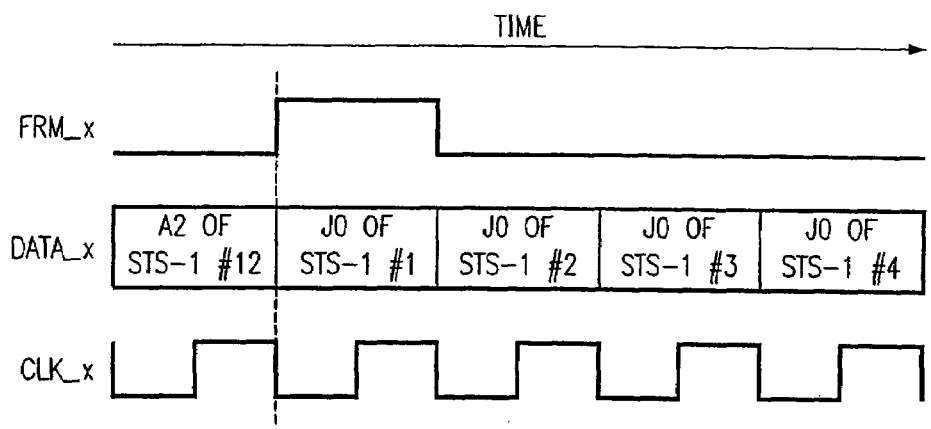
FIG. 3D is a simplified timing diagram illustrating data source signal relationships associated with aligning data in a network environment.
Figure 3E:
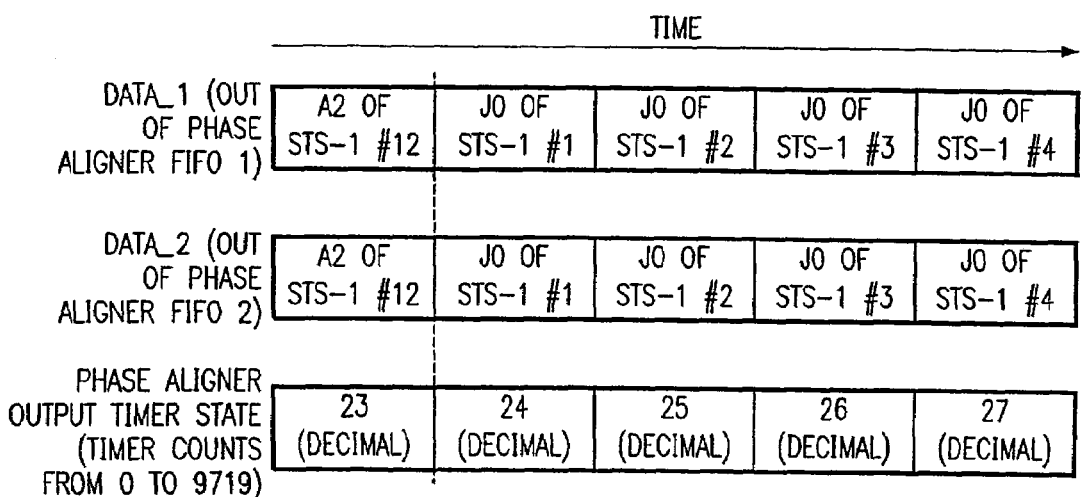
FIG. 3E is a simplified timing diagram illustrating one or more output signal relationships associated with aligning data in a network environment.

A data source signal relationship is illustrated by the example timing diagram of FIG. 3D, and FIG. 3E is a simplified timing diagram illustrating aligner output signal relationships. In FIG. 3E, the timer output marks the byte number of the bytes of the data stream. Byte zero of the data stream may correspond to the A1 byte of the first STS-1. Because data phase aligner 36a may include phase aligner FIFO elements 50 and 52, phase aligner FIFO elements 50 and 52 may be used to align DATA_1 and DATA_2 to a common reference ('RECOVERED REF') supplied by timing recovery circuits 20a-f. Data phase aligner 36a effectively aligns the SONET TOH epochs associated with two sources. Thus, following successful alignment, the relationships between two output data streams and their subsequent relationship to phase aligner output timer 54 is now in accord as illustrated by the timing diagram of FIG. 3E. The TOH bytes of the two sources may be properly aligned at the output of two phase aligner FIFO elements 50 and 52. The depths of phase aligner FIFO elements 50 and 52 may be greater than two times the maximum skew occurring between two example sources. Thus, a one-hundred twenty byte FIFO as illustrated in FIG. 2 may correct for a skew of approximately sixty byte times between the two sources.

Figure 3F:
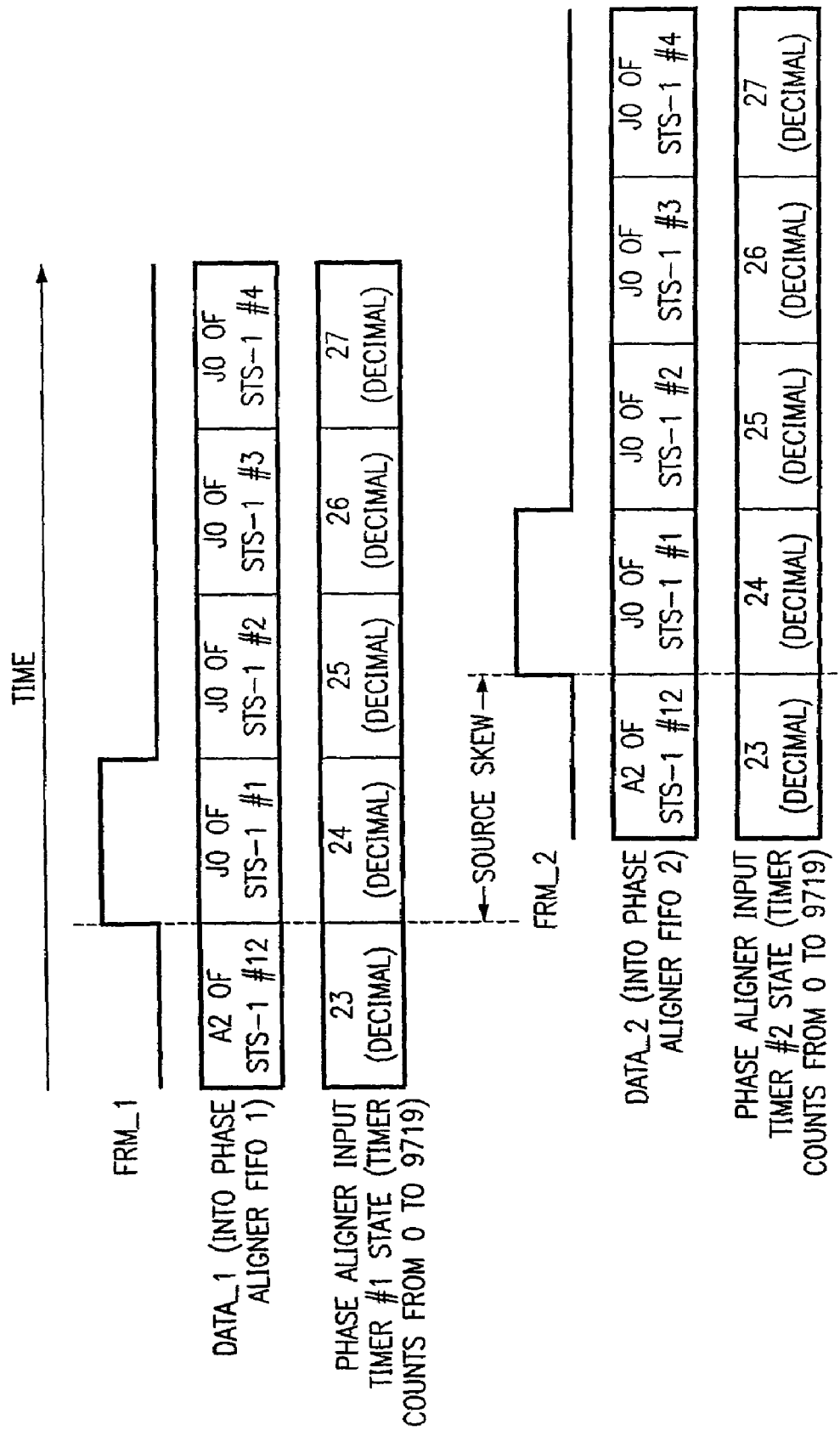
FIG. 3F is a simplified timing diagram illustrating one or more input signal relationships associated with aligning data in a network environment.

FIG. 3F is a simplified timing diagram that further illustrates input signal relationships for data phase aligner 36a that correspond to an in-frame condition. Again, the timer may mark the byte number of the bytes of the data stream. Byte zero of the data stream may correspond to the A1 byte of the first STS-1. The value loaded into phase aligner input timers 58a-b may be a fixed value in the example provided. The value loaded may be designated such that the relationship illustrated in FIG. 3F is obtained. For example, depending upon a given implementation, if the arrival of the 'FRM_x' pulse is used to load the timer, the value loaded may be twenty five in a decimal format. (It should be noted that throughout this disclosure, when a value is loaded into a timer the value appears as the state of the timer in the clock period immediately following the clock period in which the load pulse occurs.)

Figure 4:
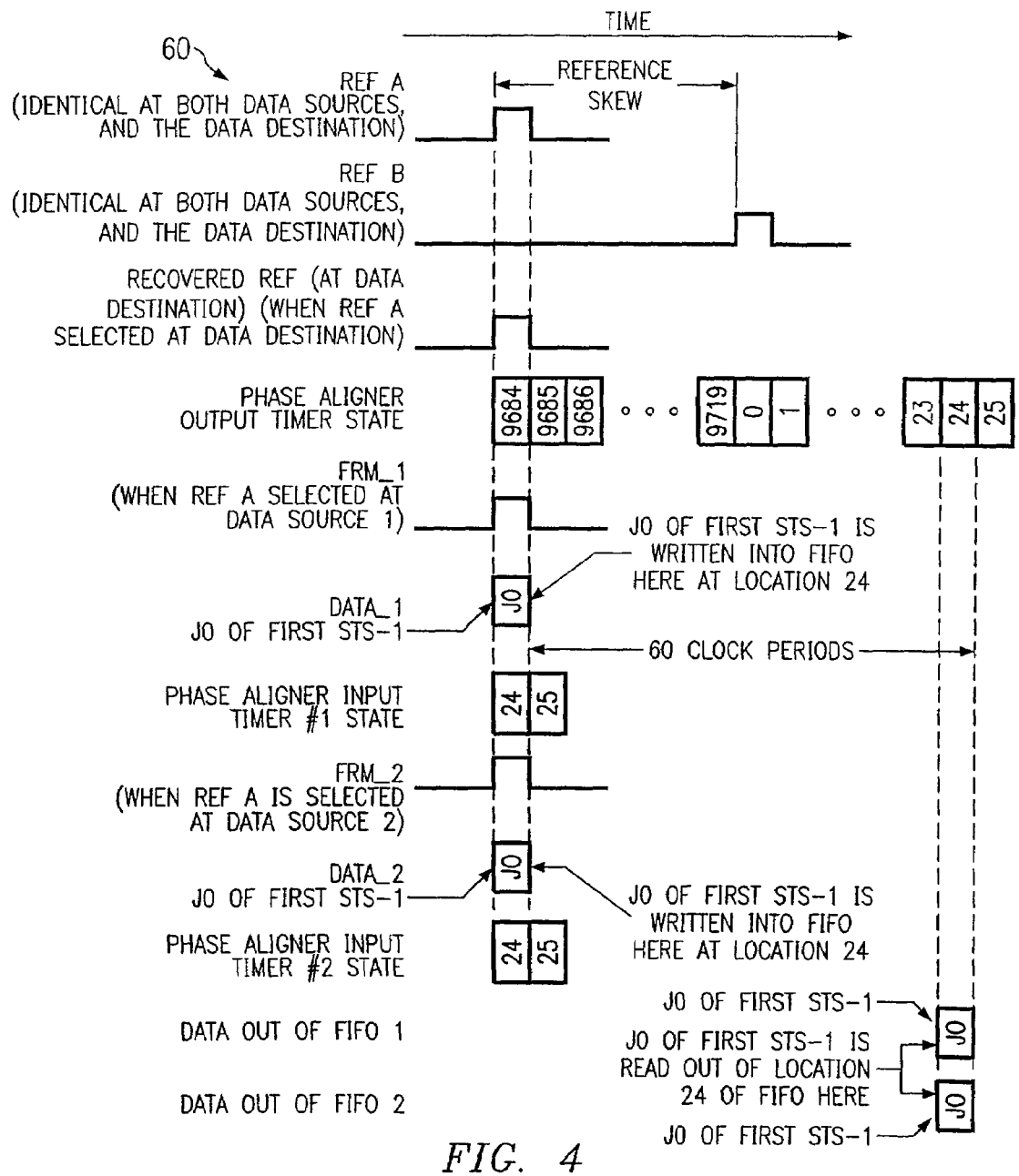
FIG. 4 is a timing diagram illustrating an example implementation of the communication system.

FIG. 3G is a simplified timing diagram illustrating an example set of timing relationships. Assuming the example timing relationships of FIG. 3G, the proper value of offset register 62 may be 9685 in a decimal format. In an example scenario where all data sources and the data destination are all selecting the same timing reference (for example all select REF A, or all select REF B,) both phase aligner FIFO elements 50 and 52 may be perfectly centered if offset register 62 is programmed to be 9685. The logic that dictates this result is illustrated in the example timing diagram shown in FIG. 4. As illustrated in FIG. 4, by offsetting the phase aligner output timer by 60 clock periods with respect to the two phase aligner input timers, the J0 byte of the first STS-1 may be read out of a corresponding FIFO sixty clock cycles after the J0 byte is written into the FIFO. Thus, both FIFOs may be centered in such a scenario. The FIFO is considered to be centered if the delay of any given byte through the FIFO is equal to the amount of time required to half fill a previously empty FIFO. The timing illustrated by FIG. 4 is potentially the most simple case to evaluate and thus has been offered for purposes of teaching only. In actual system scenarios, the timing signals may not be perfectly aligned with one another. Such implementations are described below with reference to FIG. 5 where (for example) the FRM_x signals are delayed by two clock periods (with respect to the corresponding timing reference signals) when they arrive at the data destination.

In the case of the data sources, the 'FRM_x' signals may align with the 'RECOVERED REF' signal as described. In an example implementation, this operation does not necessarily have to be the case because any signal differences that depart from optimal, ideal, or theoretical signals may be accommodated via adequate programming of offset register 62 associated with phase aligner output timer 54. The actual delay between the reference signals and the 'FRM_x' signals is not necessarily critical provided these delays are generally constant across physical entities or modules in communication system 10. For example, if both Data Source 1 and Data Source 2 are obtaining their timing from master timing generator A 40, the timing relationship between the 'FRM_x' signal and the REF A signal (from master timing generator A 40) may be a fixed constant value on both data sources.

Offset register 62 is a memory element that should normally be programmed such that if data source 'x' is choosing 'REF z' as its timing source, and the data destination is also choosing 'REF z' as its timing source, then FIFO elements 50 or 52 associated with data source 'x' are either centered or reasonably close to centered at the data destination. For example, if the two data sources are using REF A for timing, and if the data destination is also using REF A for timing, then assuming that offset register 62 associated with phase aligner output timer 54 is programmed correctly, both FIFO elements 50 and 52 may be centered at the data destination.

A set of frame alignment checkers 64a and 64b may be provided in data phase aligner 36a. Frame alignment checkers 64a-b are processing elements that may be used to verify that the data out of FIFO elements 50 and 52 are aligned according to phase aligner output timer 54. In the embodiment of FIG. 2, this block generally initiates no action if the data is not aligned. Suitable hardware or software may be used to report the condition to a controlling entity. If framer state machines 56a and 56b are indicating an in-frame condition, offset register 62 is programmed correctly, the skew between DATA_1 and DATA_2 is within the bounds of the alignment ability of phase aligner FIFO elements 50 and 52, and all clocks are present, then frame alignment checkers 64a and 64b may declare an alignment present.

FIG. 4 is a timing diagram 60 illustrating an example scenario operation of communication system 10. The proper value of offset register 62 may be designated in a decimal format. In the case where both data sources and the data destination are all choosing the same timing reference (either REF A or REF B), both FIFO elements 50 and 52 may be centered where offset register 62 is programmed to a selected decimal representation. A selected byte of the first STS-1 (J0, for instance), may be read out of each of FIFO elements 50 and 52 approximately sixty clock cycles after the selected byte (J0) is written into a corresponding FIFO element 50 or 52. Thus, both FIFO elements 50 and 52 may be centered in such a case.

Figure 5:
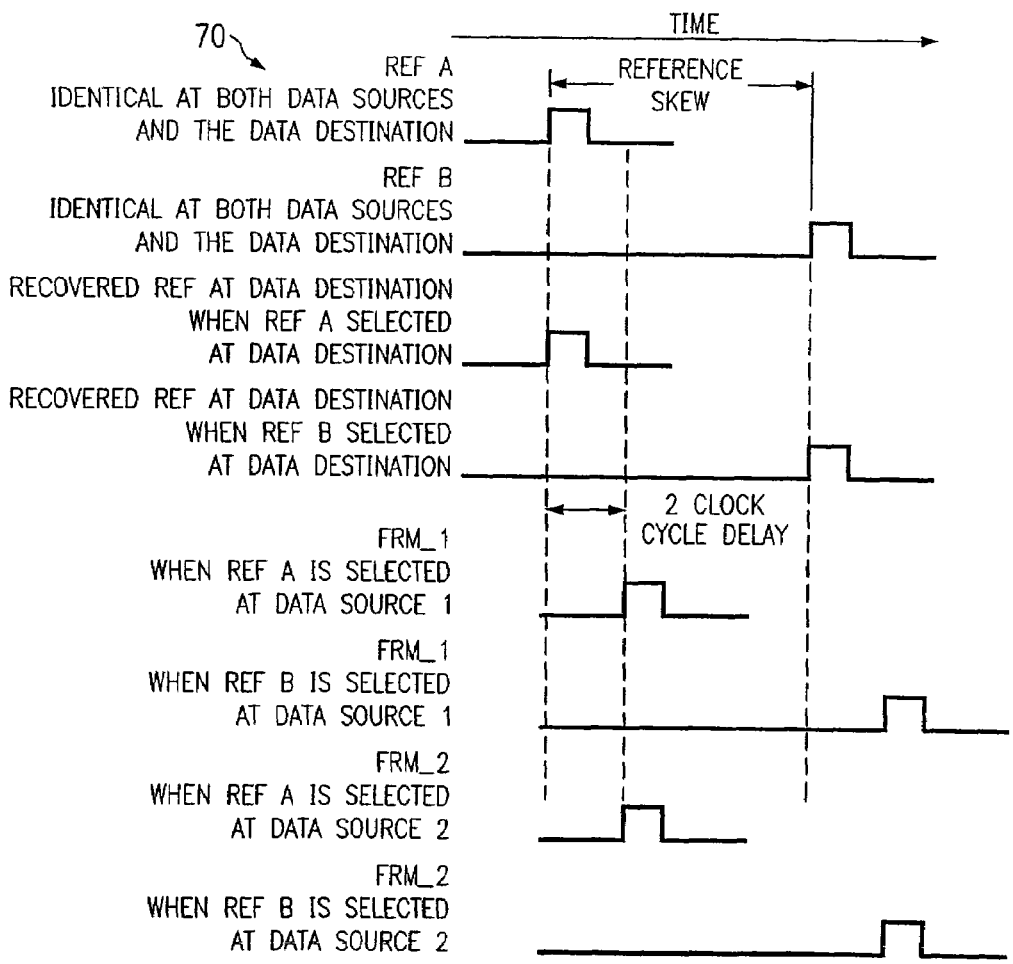
FIG. 5 is a timing diagram illustrating another example implementation of the communication system.

FIG. 5 is a timing diagram 70 illustrating an alternative example scenario operation of communication system 10. In some cases, timing signals may not be perfectly aligned with one another. FIG. 5 offers an example case where the 'FRM_x' signals are delayed by two clock pulses with respect to the chosen timing reference signal. In an actual system implementation, some type of delay may be experienced. However, as long as the delay is fixed and deterministic, a corresponding data phase aligner may accommodate the delay by proper programming of offset register 62 associated with a corresponding phase aligner output timer 54. Once a given system is implemented, the actual delays may be determined. Small variances around a nominal delay may be suitably absorbed by FIFO elements 50 and 52. This reflects the point that each of FIFO elements 50 and 52 do not have to be perfectly centered in the case where data sources are choosing the same timing reference as the data destination. Accordingly, each of FIFO elements 50 and 52 may be large enough to absorb such small variations.

Figure 6:
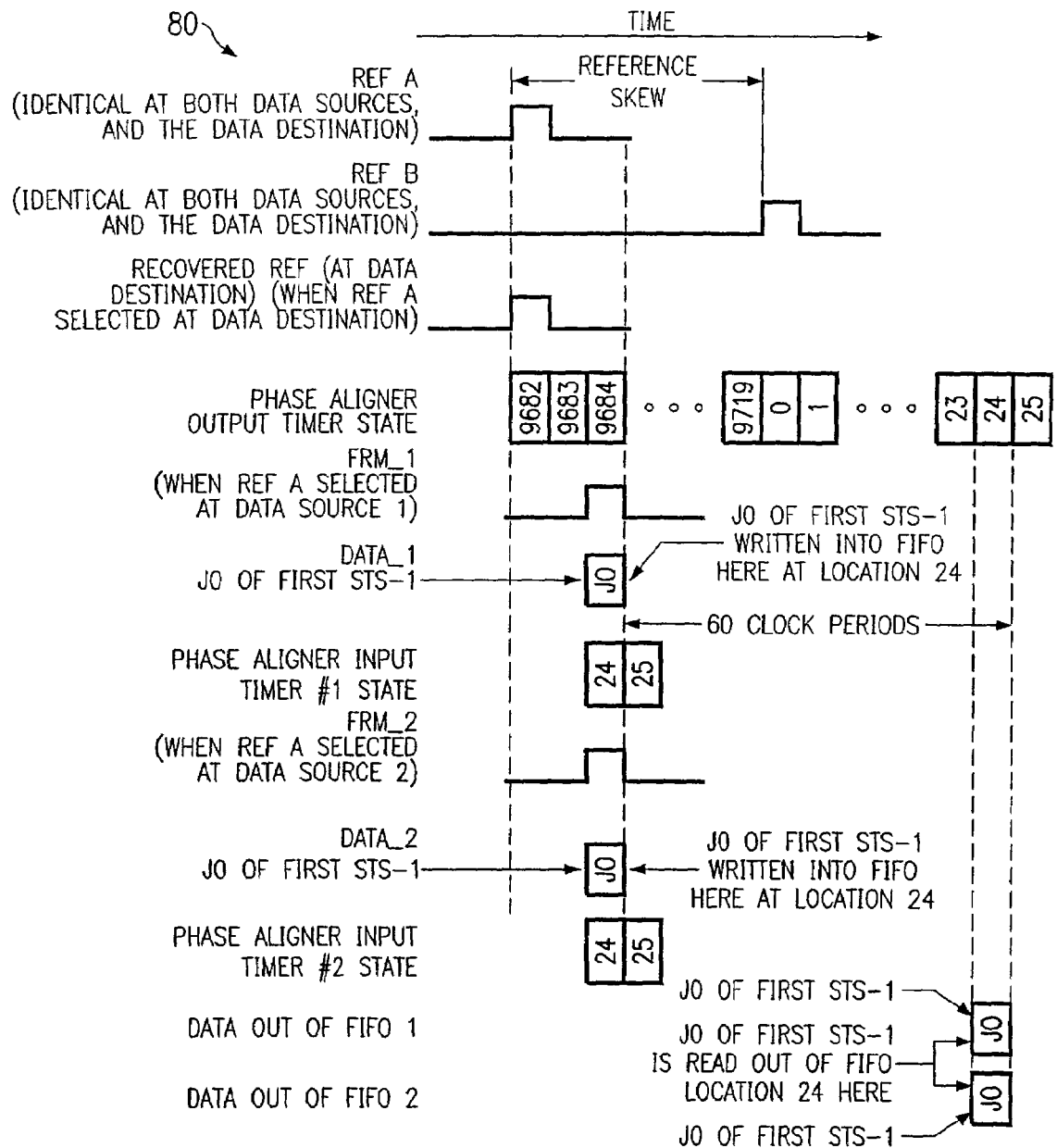
FIG. 6 is a timing diagram associated with FIG. 5 that further illustrates an example implementation of the communication system.

For the timing relationship illustrated in FIG. 5, offset register 62 may need to be programmed with an example value of 9683 (decimal) as the phase aligner output timer state. FIG. 6 is a timing schematic 80 that illustrates this example implementation. REF A and REF B signals may be similar at both data sources and the data destination. Additionally, the J0 byte of the first STS-1 may be written into a selected FIFO element 50 or 52 when the state of phase aligner output timer 54 is at a value of 9684 (decimal) following the selected 9683 (decimal) value. The J0 byte may be read from a corresponding FIFO element 50 or 52 when the state of phase aligner output timer 54 is at twenty-four, approximately sixty clock periods after the J0 byte was written to the designated location.

Even though the data destination is using the same reference as the two data sources, the arriving data from the two data sources is not aligned to the local reference at the data destination. The arriving data (and the associated frame pulses 'FRM_x') are offset from the local reference by two clock periods. (This may be due to propagation delay from the data sources to the data destination.) However, this can be compensated for by adjusting the offset register value by two (with respect to the value that was programmed for the example shown in FIG. 4). In all cases the J0 byte of the first STS-1 is always written into the FIFO (location 24) when the input timers are of state 24, and in all cases, the J0 bytes of the first STS-1 are read out of two FIFOs (from location 24) when the output timer is at state 24. By offsetting the output timer by 2, the misalignment of the arriving data to the local reference of the data destination can be compensated for such that the two FIFOs are still centered.

Figure 7:
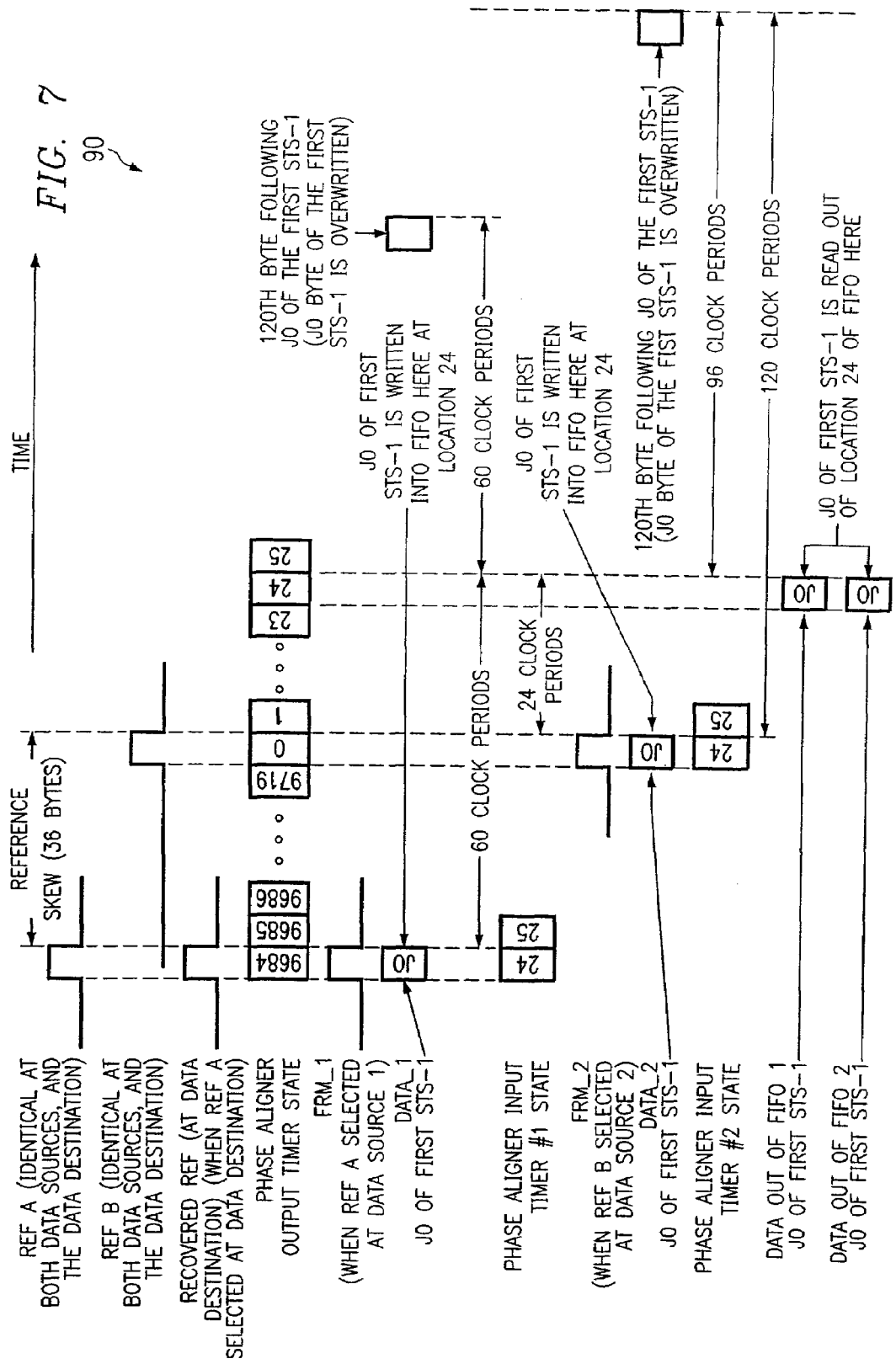
FIG. 7 is a timing diagram illustrating yet another example implementation of the communication system.

FIG. 7 is a timing schematic 90 illustrating yet another example scenario operation associated with communication system 10. FIG. 7 further represents a case where Data Source 1 is choosing a different timing reference than Data Source 2. This example may assume the basic timing relationship shown such that Data Source 1 and the corresponding data destination correlate to REF A as their timing source. In addition, Data Source 2 may correlate to REF B as its timing source. In such a case, the value of phase aligner output timer offset register 62 may be 9685 (decimal). FIFO element 50 may be centered because its corresponding source is choosing the same reference as the data destination. However, FIFO element 52 may no longer be centered and is offset from center by an amount equal to the skew between the two references (REF A and REF B). For the example provided in FIG. 7, there may still be twenty-four byte times worth of timing margin associated with FIFO element 52. This may define that the worst case spacing between the read and write addresses of a corresponding FIFO element may be approximately twenty-four clock periods (since 60-36=24). The other processing parameters for this example may be similar to those described above with reference to FIG. 4.

Figure 8:
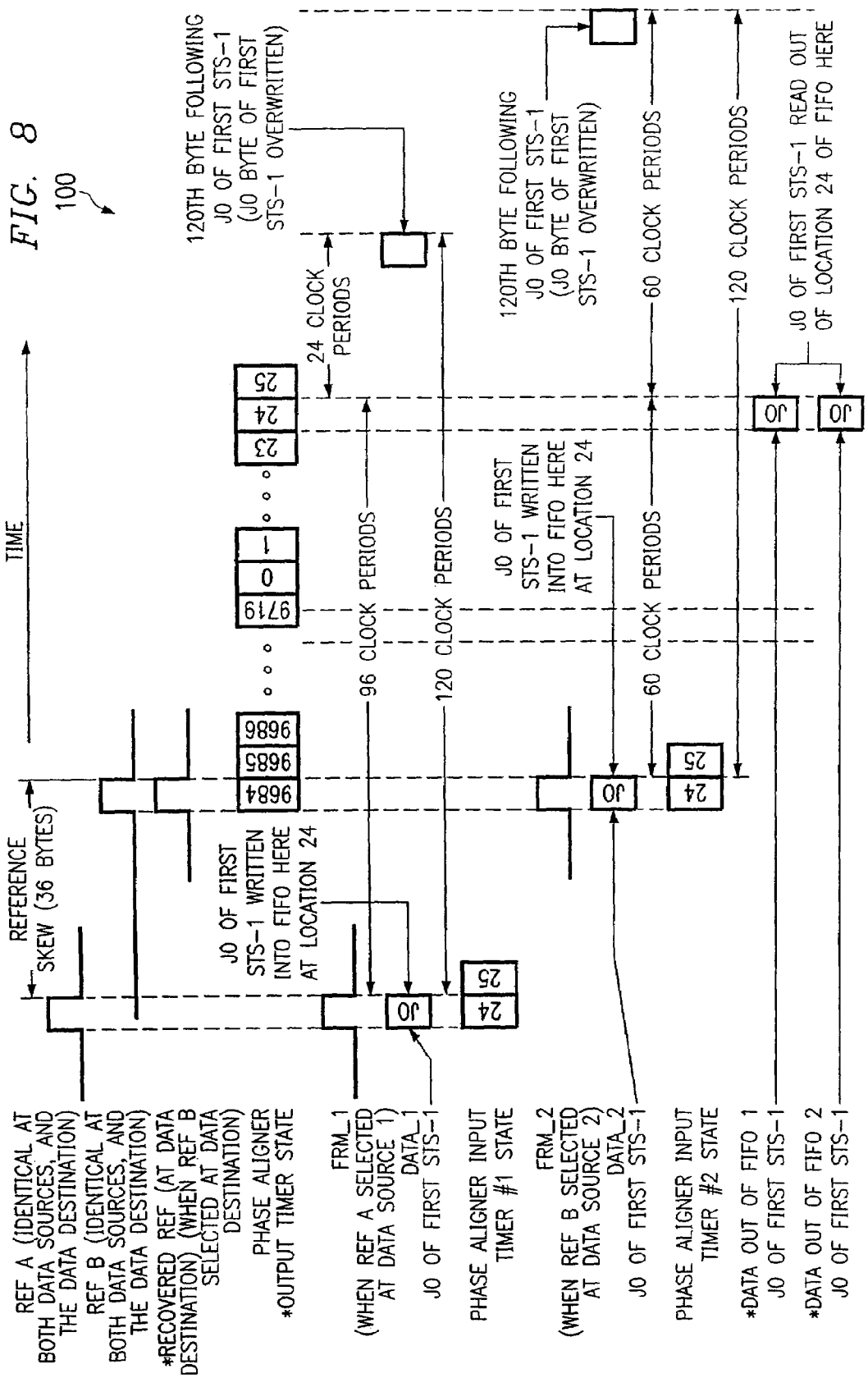
FIG. 8 is a timing diagram illustrating still another example implementation of the communication system.

FIG. 8 is a timing diagram 100 illustrating yet another example scenario operation associated with communication system 10. FIG. 8 further provides an example of how FIFO elements 50 and 52 behave when various modules switch clock references. The example provided presumes that offset register 62 is programmed with a value of 9685 (decimal). Assuming that the initial system configuration is that illustrated in FIG. 7, FIG. 8 further illustrates what happens when the data destination switches from REF A to REF B.

Switching from REF A to REF B causes the voltage controlled oscillator (VCO) within the timing recovery circuit at the data destination to slow down. Thus, each of FIFO elements 50 and 52 may increase in depth because reading from FIFO elements 50 and 52 is slower for a period of time. In addition, each FIFO element 50 and 52 may increase in depth by an amount equal to the skew between the two references (thirty-six bytes in the example provided). Thus, FIFO element 50 may increase from sixty bytes to ninety-six bytes, and FIFO element 52 may increase from twenty-four bytes to sixty bytes. FIFO element 52 may now be centered (as it should be because it is using the same reference as Data Source 2), while phase aligner FIFO element 50 is no longer centered, and it is offset from center by an amount equal to the skew between REF A and REF B. For this case, there is now twenty-four clock periods worth of margin associated with FIFO element 50. This means that the worst case spacing between the read and write addresses of the FIFO is 24 clock periods.

A star (*) in front of the signals indicates a signal change from the starting point. Four signals have experienced movement from the stage shown previously in FIG. 7. The signals that have changed are the RECOVERED REF, the phase aligner output timer state, data out of FIFO 1, and data out of FIFO 2. Because data through a given FIFO element 50 or 52 may only be corrupted when the two address pointers of a given FIFO element pass one another, no data is corrupted during the clock switch.

Figure 9:
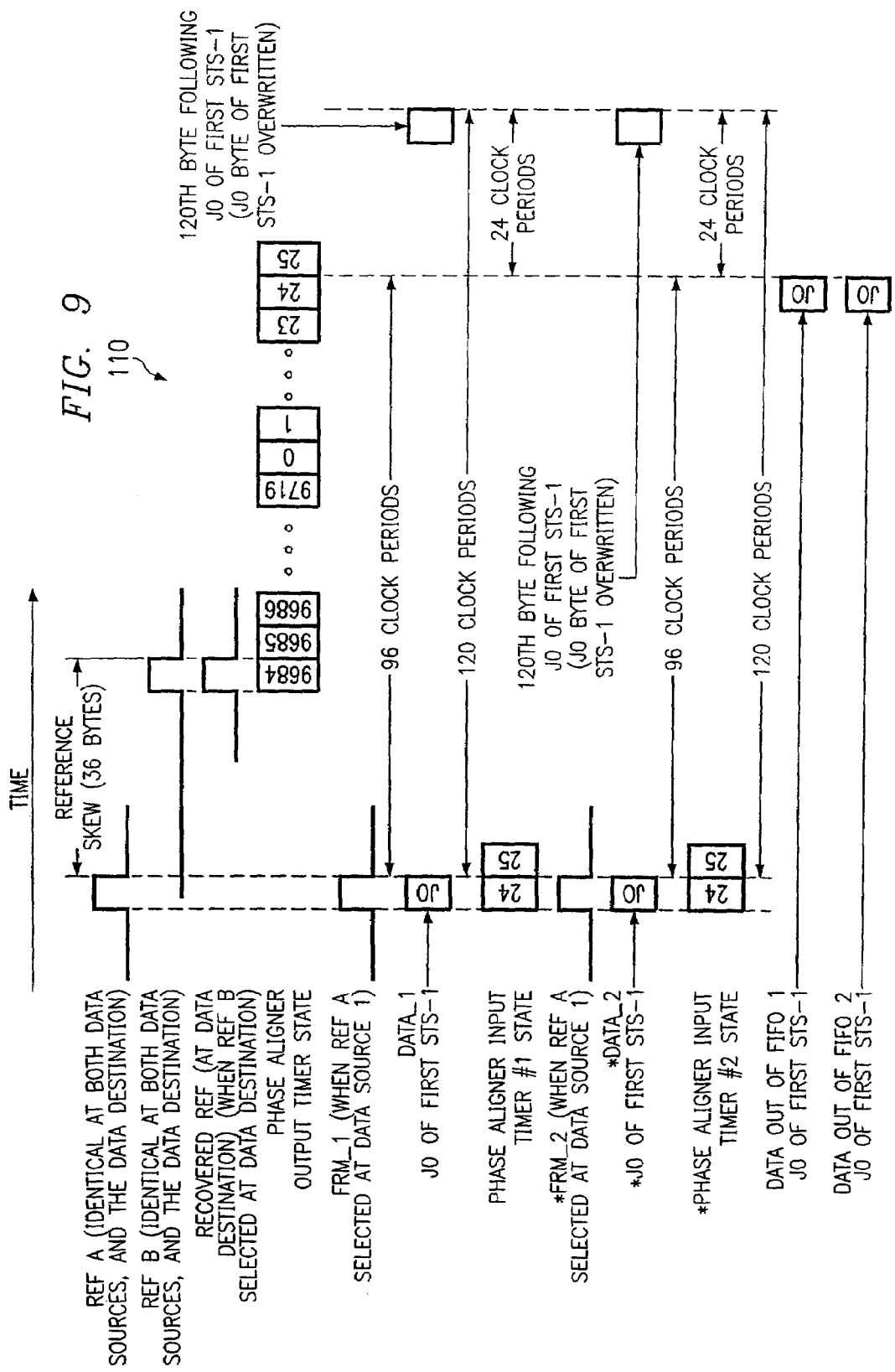
FIG. 9 is a timing diagram illustrating another example implementation of the communication system.

FIG. 9 is a timing diagram 110 illustrating yet another example scenario operation of communication system 10. The example provided in FIG. 9 illustrates a scenario for a given FIFO element operation when Data Source 2 switches its clock reference. Assuming that the initial system configuration is that of FIG. 8, FIG. 9 further illustrates what happens when Data Source 2 switches from clock reference REF B to clock reference REF A. Switches from REF B to REF A at Data Source 2 may cause the voltage controlled oscillator (VCO) within the timing recovery circuit at Data Source 2 to speed up for a period of time. Accordingly, the depth of FIFO element 52 may increase because data is being written into FIFO element 52 faster for a period of time.

Specifically, the depth of FIFO element 52 may increase from sixty bytes to ninety-six bytes, an increase equal to the skew between the two references. The result produced reflects that neither of the two FIFO elements 50 and 52 are centered at the data destination. Both FIFO elements 50 and 52 have twenty-four bytes of margin associated with them. As shown by the designation of a star (*) in front of the signal names of the signals that have changed from the starting point figure, three signals have experienced movement from the stage illustrated by FIG. 8. The signals that have changed are DATA_2, FRM_2, and the phase aligner input timer #2 state. Because data through a given FIFO element is generally corrupted when the two address pointers of the FIFO element pass one another, data is not corrupted during the clock switch.

Figure 10:
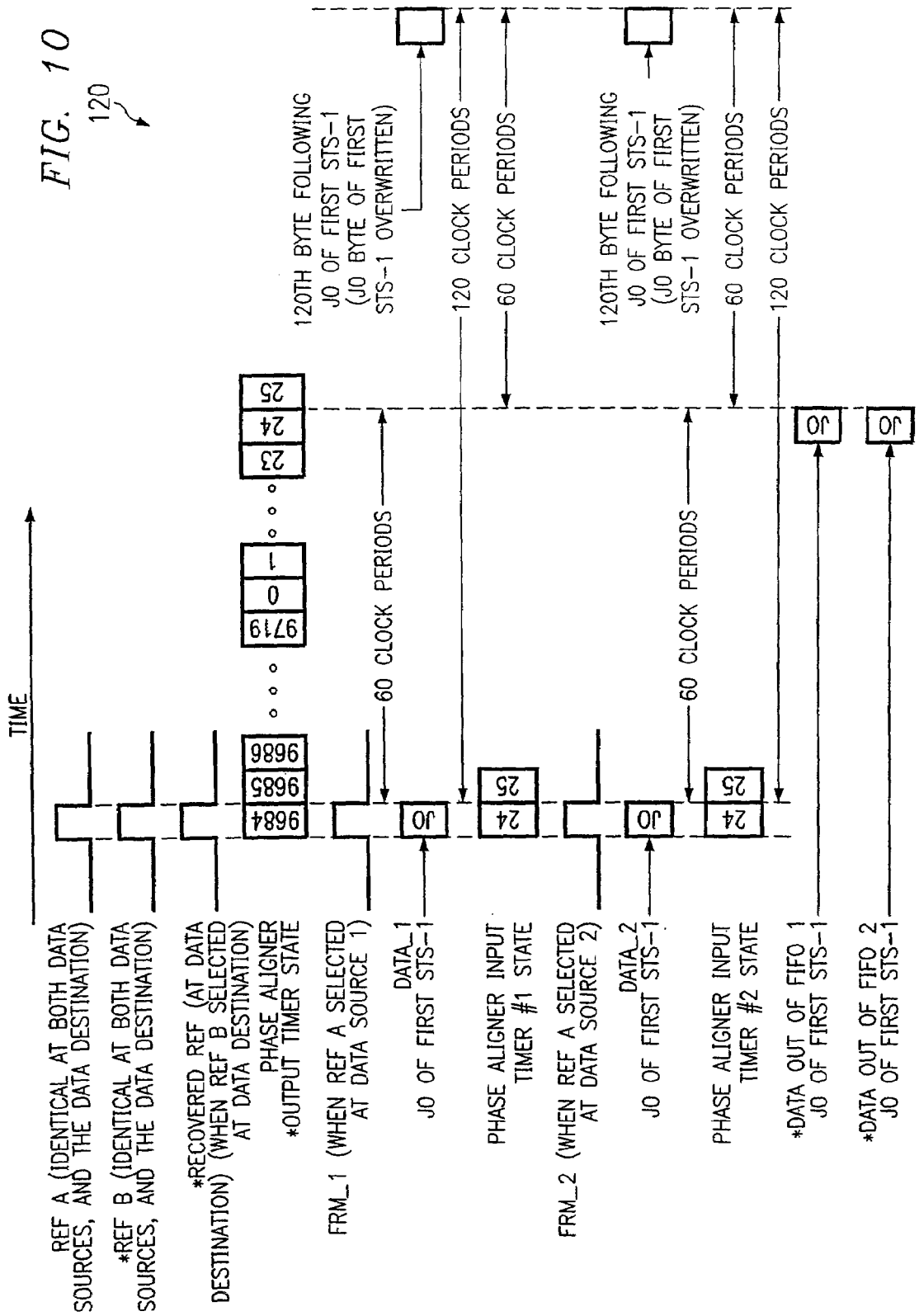
FIG. 10 is a timing diagram illustrating another example implementation of the communication system.

FIG. 10 is a timing diagram 120 illustrating yet another example scenario operation of communication system 10. The example shown in FIG. 10 presumes that master timing generator B 42 is slaved to master timing generator A 40. Additionally, it may be presumed for purposes of example that the entire skew between the outputs of the two generators (REF A and REF B) is due to this master/slave arrangement. FIG. 10 offers an example that explores a FIFO element operation when a role-reversal occurs between two master timing generators, i.e., master timing generator B 42 now assumes the role of the master.

For such a situation, the positions of the REF A and REF B signals execute a swap. Assuming the initial configuration of FIG. 9, master timing generator B 42 may first become a master, causing its output reference (REF B) to align with that of master timing generator A 40. This assumes that each of the generators are both locked to the same external reference. Now both master timing generator A 40 and master timing generator B 42 are acting as masters. The result of this situation is illustrated in FIG. 10. Master timing generator A 40 then becomes a slave to master timing generator B 42, and the result of this situation is reflected in FIG. 11.

Figure 11:
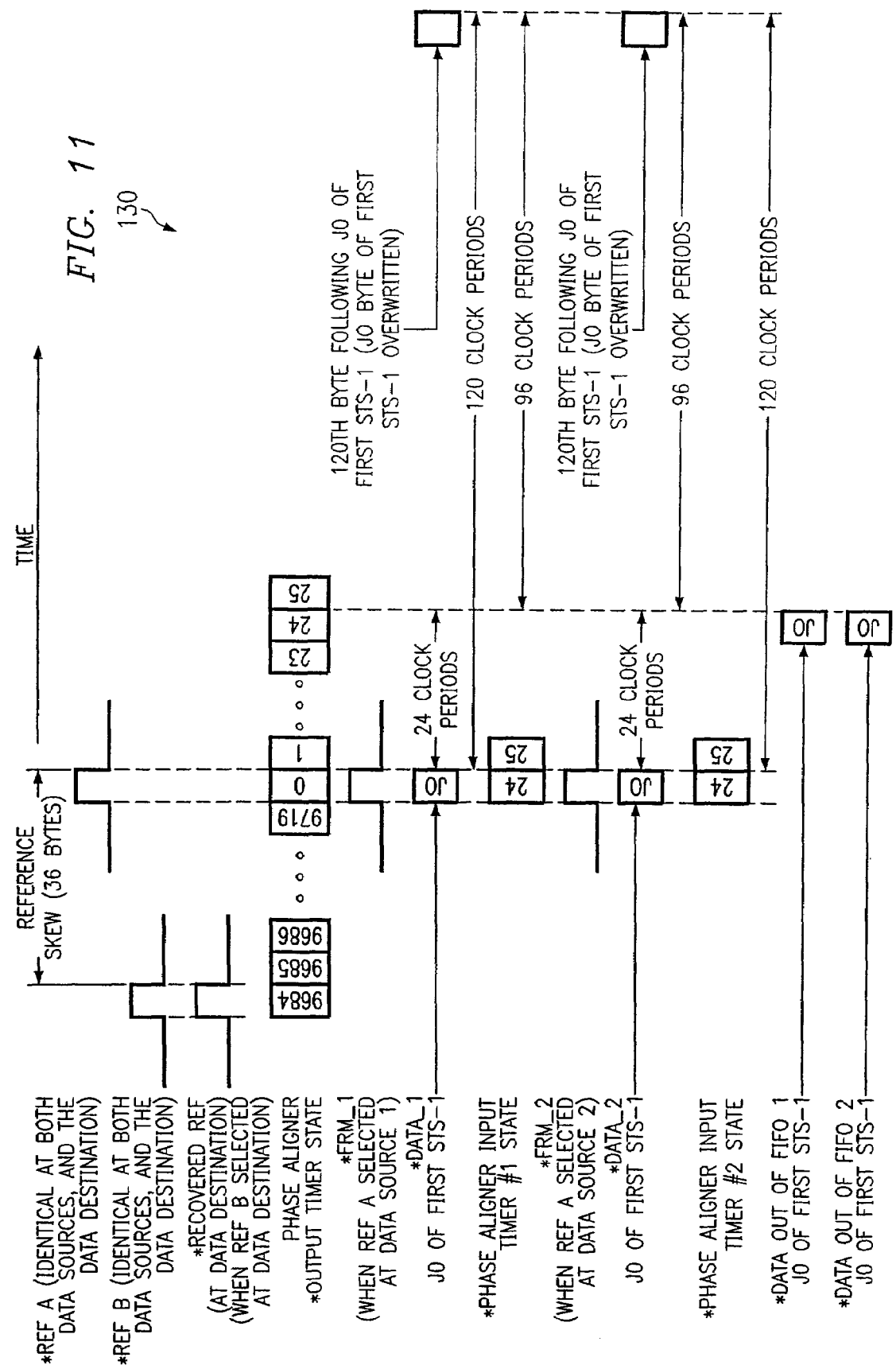
FIG. 11 is a timing diagram associated with FIG. 10 that illustrates another example implementation of the communication system.

FIG. 11 is a simplified timing diagram 130 that illustrates additional details relating to the shift in master-slave operation. Data through a given FIFO element may only be corrupted when the two address pointers of the corresponding FIFO element pass one another and accordingly no data is corrupted during the clock switch.

Figure 12:
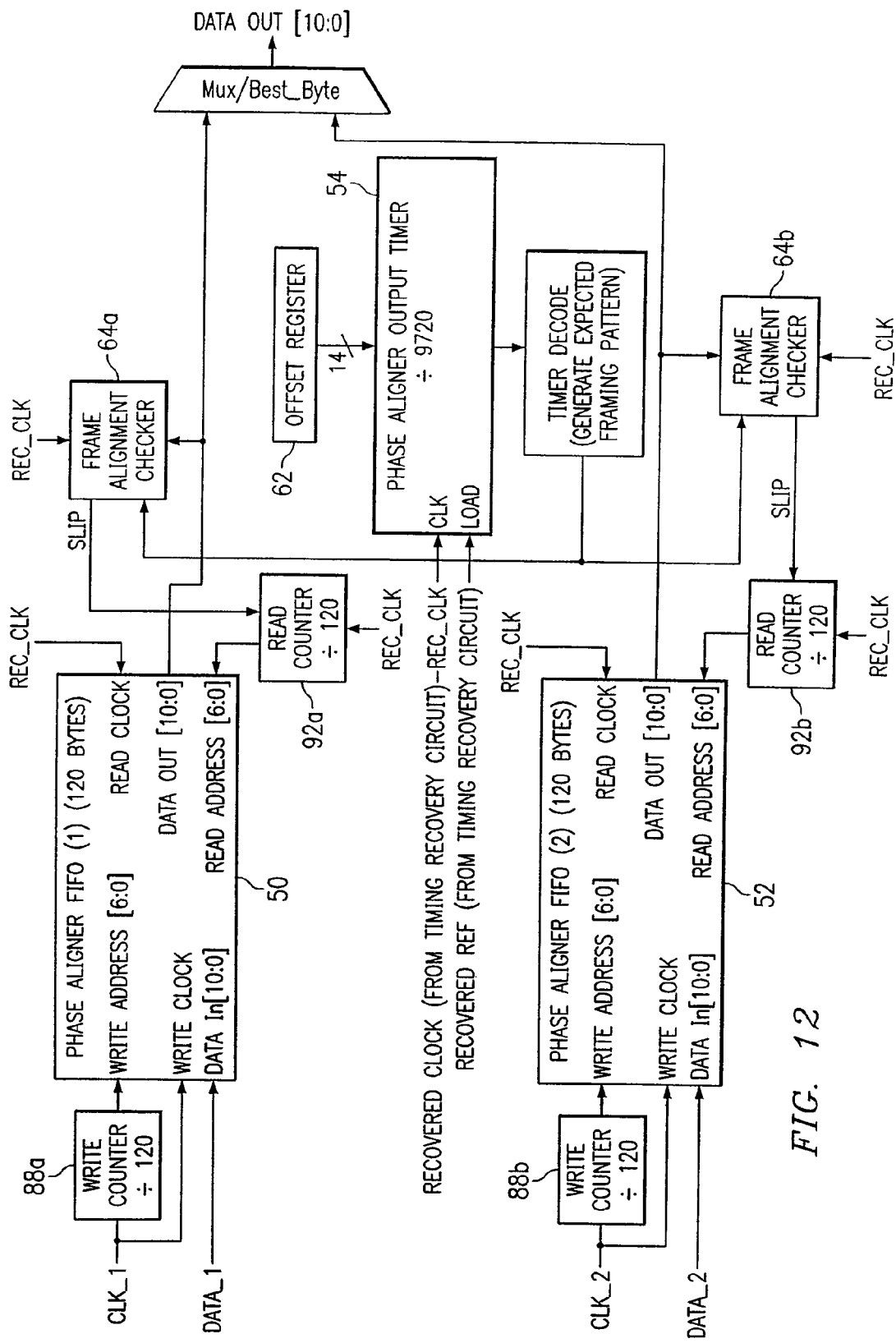
FIG. 12 is an alternative embodiment of the data phase aligner included within the communication system.

FIG. 12 is a block diagram illustrating an alternative embodiment of data phase aligner 36a or 36n of FIG. 1. The alternative embodiment of FIG. 12 includes similar components to those found in FIG. 2. However, some of the differences illustrated in FIG. 12 include the J0 byte of the first STS-1 byte no longer needs to be written to a specific location within a corresponding FIFO element. In this sense, each of a set of write counters 88a and 88b that are provided may be allowed to free run where each write counter is allowed to be in any arbitrary state with respect to the start of the STS-12 frame of its associated input data stream. In addition, no framer state machine and no division by 9720 counter is required before arriving at a given FIFO element.

Moreover, phase aligner output timer 54 may no longer directly be used to read data from a given FIFO element. Instead, a separate set of read counters 92a-b may be implemented. Also, phase alignment output timer 54 no longer needs to be constructed in a manner such that the lower portion of the timer matches the size of the corresponding FIFO element 50 or 52. Other differences in this embodiment may include the FIFO element size that no longer needs to be restricted to sizes that are a divisor of 9720. Thus, for example, a FIFO element size of one-hundred twenty-eight may be used. In addition, a set of phase alignment checkers 64a-b may play an active role in aligning data out of the given FIFO elements to an expected framing pattern. Each phase alignment checker 64a-b may generate a SLIP signal that causes read counters 92a and 92b to slip or delay one clock period every STS frame until alignment is found. Once frame alignment checkers 64a-b locate the first occurrence of the framing pattern, the slip signal may be disabled.

In a worst case scenario, frame alignment checkers 64a-b may have to search an entire FIFO element 50 or 52 in order to locate the SONET framing pattern that matches the expected framing pattern. Because a given FIFO element 50 or 52 may be approximately one-hundred twenty bytes, frame alignment checkers 64a and 64b may have to generate a total of one-hundred nineteen slips for a worst case scenario. Because a slip is generated every SONET frame, and since each SONET frame has a period of one-hundred twenty five microseconds, it may take as long as fifteen milliseconds to locate the framing pattern within a corresponding FIFO element 50 or 52 in the example implementation. Once the framing pattern is located for the first time, the framing pattern may be observed a couple of additional times before declaring an alignment. Thus, for this alternative embodiment, the total alignment time might be as long as 15.25 milliseconds. This alignment time is approximately forty times longer than the alignment time of the embodiment illustrated in FIG. 2.

The previous timing schematics may still apply to the alternative phase aligner shown in FIG. 12, provided that the J0 byte of the first STS-1 is also written to location twenty-four of both FIFO elements 50 and 52. However, this is not a requirement with this alternative phase alignment.

In order to further clarify the relationships between write counters 88a-b, read counters 92a-b, and the alternative phase aligner illustrated in FIG. 12, the following scenario is offered for purposes of teaching. Suppose that a timing relationship as illustrated in FIG. 4 is slightly modified. Instead of writing the J0 byte of the first STS-1 into location twenty-four of the corresponding FIFO element 50 or 52, the byte may be written to location zero of a selected FIFO element 50 or 52.

With respect to phase aligner output timer 54, the J0 byte of the first STS-1 may still be written when the timer is at 9684, and may still be read when the timer is at twenty-four. However, the J0 byte of the first STS-1 may now be read from location zero of the selected FIFO element 50 or 52. Thus, read counters 92a-b may be at zero when this byte is read. Because the byte is read sixty clock periods after it was written (as illustrated in FIG. 4), a corresponding write counter 88a-b may be at sixty time intervals when the J0 byte of the first STS-1 is read out of the corresponding FIFO element 50 or 52. Because write counters 88a-b and read counters 92a-b may be spaced apart by sixty clock cycles, the corresponding FIFO element 50 or 52 may be centered appropriately. Alternatively, if the J0 byte of the first STS-1 is written to location one of a given FIFO element, read counters 92a-b may be at one when the byte is read from the corresponding FIFO element, whereby a corresponding write counter 88a or 88b is at a value of sixty-one.

Figure 13:
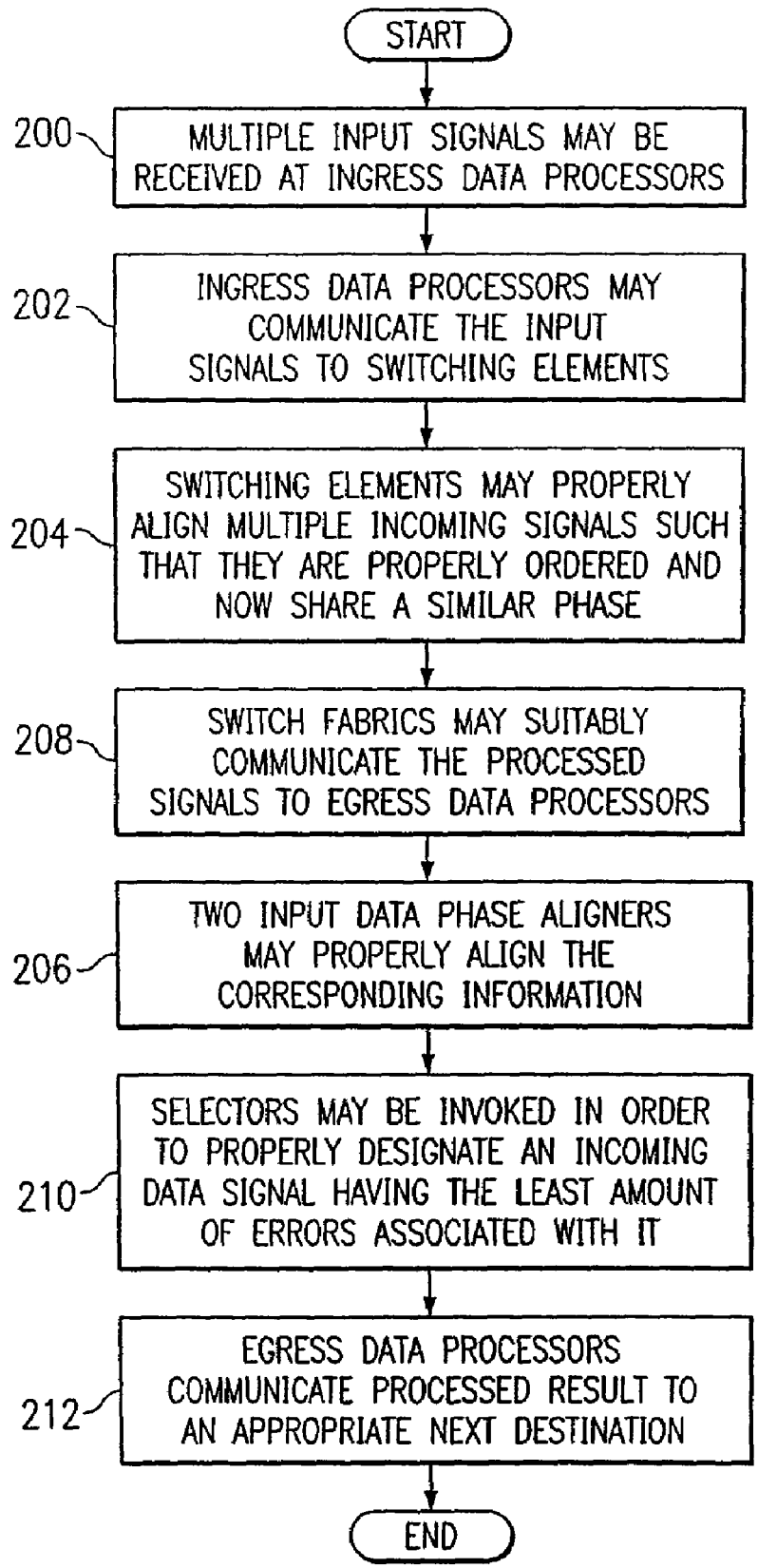
FIG. 13 is a flowchart illustrating a series of example steps associated with a method for aligning data in a network environment.

FIG. 13 is a simplified flowchart illustrating a series of example steps for processing data in communication system 10. The method begins at step 200, where multiple input signals may be received at ingress data processors 12a-n. At step 202, ingress data processors 12a-12n may communicate the data signals to switching elements 16a-b. At step 204, switching elements 16a-b may properly align multiple incoming signals such that they are properly ordered and now maintain or share a similar phase. Data phase aligners 28a-b may properly align the information and cooperate with timing recovery circuits 20c and 20d in order to execute this operation. After the input signals are properly aligned, switch fabrics 30a-30n may then suitably communicate the information to egress data processors 18a-n at step 206. At step 208 two-input data phase aligners 36a-b may properly align the corresponding information.

Where egress data processors 18a-n are used for redundancy or error checking operations, two-input data phase aligners 36a-b may be implemented in order to select an optimal data stream. At step 210, selectors 38a and 38n may be invoked in order to properly designate an incoming data signal having the least amount of errors associated with it. Selectors 38a and 38n may then signal to egress data processors 18a-n that it is proper to communicate the optimal signal to a corresponding next destination. Egress data processors 18a-n communicating a processed result to an appropriate next destination at step 212.

Some of the steps illustrated in FIG. 13 may be changed or deleted where appropriate and additional steps may also be added to the flowchart. These changes may be based on specific communication architectures or particular networking arrangements or configurations and do not depart from the scope or the teachings of the present invention.

In summary, the phase alignment technique described above include a number of technical advantages. For example, an approach for aligning data is provided that operates to precisely direct information to a corresponding next destination. This is a result of a data phase aligner that may receive one or more data streams and accurately process/order the information such that it is properly arranged. This ordering or synchronization may increase processing speeds and further ensure the accurate delivery of information or data contained within the data stream. The data phase aligner may also provide a redundancy feature to the communications system in cases where two data streams have a substantially similar data payload and are communicated to a single network node. The two data streams may be suitably compared such that the data stream that contains more errors is discarded. The other data stream having higher integrity may then be properly forwarded to an appropriate next destination. Thus, the data phase aligner may increase the accuracy and efficiency of an associated communication propagating through the network. Alignment can be achieved when a first data stream is either ahead or behind in phase with respect to the second data stream, when different clock sources are used to generate the first and second data streams, when the data destination uses a different clock source than either of the first or second data streams, when either the first or second data stream changes its clock source, when the data destination changes its clock source, and despite master timing generators switching between master and slave.

Although the present invention has been described in detail with reference to particular embodiments, it should be understood that various other changes, substitutions, and alterations may be made hereto without departing from the spirit and scope of the present invention. For example, although the present invention has been described with reference to a number of potentially suitable components that facilitate the processing of information in various types of formats, any suitable objects, elements, hardware, or software may be used in the applications or operations described above. The arrangements described above in conjunction with communication system 10 provide only an example configuration used for purposes of teaching, numerous substitutions and modification may be made where appropriate and according to particular needs.

In addition, although communication system 10 has been described as operating in a particular environment, the present invention may be used in any suitable environment or application that seeks to receive, transmit, or communicate data or information. For example, communication system 10 may be used in conjunction with frame relay, X.25, or any other type of packet or circuit-switched applications. Moreover, switching elements 16a-b may accommodate additional communications protocols such that a common interface is provided to a corresponding network.

Additionally, although FIGS. 1-13 have been described with reference to specific electronic elements in various configurations and formats, any suitable architecture may be provided in conjunction with communication system 10 without departing from the scope of the present invention. Other appropriate networking components or suitable hardware and software may be provided within or external to communication system 10 in any appropriate arrangement. These alternative designs may be provided, designated, or otherwise selected in order to offer specific communications parameters that may in turn influence one or more properties associated with communication operations. For example, one or more elements within communication system 10 may change based on specific bandwidth requirements or constraints. In another example, only data phase aligners 28a-b may be provided in communication system 10 in order to properly align data. In yet another example, only two-input data phase aligners 36a-n may be provided in communication system 10 in order to provide an error checking or redundancy feature to communication system 10. In still other examples, many of the components of communication system 10 (or the internal elements thereof) may be deleted without departing from the teachings of the present invention. The present invention offers substantial flexibility in the potential architectures that may be constructed using one or more of the elements described with reference to FIGS. 1-13.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A system for aligning data, comprising:
   means for storing a first data source signal in a first buffer element, the first data source signal being associated with one of a first frame reference signal and a second frame reference signal;
   means for storing a second data source signal in a second buffer element, the second data source signal being associated with one of the first frame reference signal and the second frame reference signal;
   means for outputting the first and second data source signals in alignment with each other in response to a recovered reference signal and a recovered clock signal, the recovered reference signal and the recovered clock signal being associated with one of the first and second frame reference signals.

2. The system of claim 1, further comprising:
   means for generating a first write address for the first buffer element to store the first data source signal in response to a first frame source signal and a first clock source signal, the first frame source signal and the first clock source signal being associated with the first data source signal;
   means for generating a second write address for the second buffer element to store the second data source signal in response to a second frame source signal and a second clock source signal, the second frame source signal and the second clock source signal being associated with the second data source signal.

3. The system of claim 1, further comprising:
   means for placing a known byte of the first and second data source signals into a known location of the respective first and second buffer elements.

4. The system of claim 1, further comprising:
   means for generating a read address to output the first and second data source signals from the respective first and second buffer elements in response to the recovered reference signal and the recovered clock signal.

5. The system of claim 1, further comprising:
   means for identifying a framing pattern in each of the first and second data source signals stored in the first and second buffers.

6. The system of claim 1, further comprising:
   means for generating a slip signal to control a read counter associated with each of the first and second buffer elements such that an output from each of the first and second buffers aligns to the recovered reference signal and the recovered clock signal.

7. The system of claim 1, further comprising:
   means for filtering out bit errors in the first and second data source signals.

8. A method for aligning data, comprising:
storing a first data source signal in a first buffer element, the first data source signal being associated with one of a first frame reference signal and a second frame reference signal;
storing a second data source signal in a second buffer element, the second data source signal being associated with one of the first frame reference signal and the second frame reference signal;
outputting the first and second data source signals in alignment with each other in response to a recovered reference signal and a recovered clock signal, the recovered reference signal and the recovered clock signal being associated with one of the first and second frame reference signals.

9. The method of claim 8, further comprising:
generating a first write address for the first buffer element to store the first data source signal in response to a first frame source signal and a first clock source signal, the first frame source signal and the first clock source signal being associated with the first data source signal;
generating a second write address for the second buffer element to store the second data source signal in response to a second frame source signal and a second clock source signal, the second frame source signal and the second clock source signal being associated with the second data source signal.

10. The method of claim 8, further comprising:
placing a known byte of the first and second data source signals into a known location of the respective first and second buffer elements.

11. The method of claim 8, further comprising:
generating a read address to output the first and second data source signals from the respective first and second buffer elements in response to the recovered reference signal and the recovered clock signal.

12. The method of claim 8, further comprising:
identifying a framing pattern in each of the first and second data source signals stored in the first and second buffers.

13. The method of claim 8, further comprising:
generating a slip signal to control a read counter associated with each of the first and second buffer elements such that an output from each of the first and second buffers aligns to the recovered reference signal and the recovered clock signal.

14. The method of claim 8, further comprising:
filtering out bit errors in the first and second data source signals.

15. A computer readable medium including code for aligning data, the code operable to:
store a first data source signal in a first buffer element, the first data source signal being associated with one of a first frame reference signal and a second frame reference signal;
store a second data source signal in a second buffer element, the second data source signal being associated with one of the first frame reference signal and the second frame reference signal;
output the first and second data source signals in alignment with each other in response to a recovered reference signal and a recovered clock signal, the recovered reference signal and the recovered clock signal being associated with one of the first and second frame reference signals.

16. The computer readable medium of claim 15, wherein the code is further operable to:
generate a first write address for the first buffer element to store the first data source signal in response to a first frame source signal and a first clock source signal, the first frame source signal and the first clock source signal being associated with the first data source signal;
generate a second write address for the second buffer element to store the second data source signal in response to a second frame source signal and a second clock source signal, the second frame source signal and the second clock source signal being associated with the second data source signal.

17. The computer readable medium of claim 15, wherein the code is further operable to:
place a known byte of the first and second data source signals into a known location of the respective first and second buffer elements.

18. The computer readable medium of claim 15, wherein the code is further operable to:
generate a read address to output the first and second data source signals from the respective first and second buffer elements in response to the recovered reference signal and the recovered clock signal.

19. The computer readable medium of claim 15, wherein the code is further operable to:
identify a framing pattern in each of the first and second data source signals stored in the first and second buffers.

20. The computer readable medium of claim 15, wherein the code is further operable to:
generate a slip signal to control a read counter associated with each of the first and second buffer elements such that an output from each of the first and second buffers aligns to the recovered reference signal and the recovered clock signal.

* * * * *